United States Patent [19]
Yoshida

[11] Patent Number: 5,398,338
[45] Date of Patent: Mar. 14, 1995

[54] RECORD RETRIEVAL METHOD USING KEY BONDARY VALUE TABLE AND CONDITION VALID STATUS TABLE

[75] Inventor: Satoshi Yoshida, Akigawa, Japan

[73] Assignee: Casio Computer Co., Ltd., Tokyo, Japan

[21] Appl. No.: 217,077

[22] Filed: Mar. 23, 1994

Related U.S. Application Data

[63] Continuation of Ser. No. 661,890, Feb. 27, 1991, abandoned.

[30] Foreign Application Priority Data

Jun. 29, 1990 [JP] Japan .................. 2-173710

[51] Int. Cl.⁶ .............................. G06F 15/40
[52] U.S. Cl. ...................... 395/600; 364/DIG. 2; 364/974; 364/962; 364/962.3; 364/974.4; 364/963; 364/963.1; 364/963.3
[58] Field of Search ................... 395/600, 700

[56] References Cited

U.S. PATENT DOCUMENTS

| | | | |
|---|---|---|---|
| 3,670,310 | 6/1972 | Bharwani et al. | 364/DIG. 1 |
| 3,822,378 | 7/1974 | Kashio | 235/176 |
| 4,003,031 | 1/1977 | Kashio | . |
| 4,031,515 | 6/1977 | Kashio | 364/DIG. 1 |
| 4,032,900 | 6/1977 | Kashio | 364/DIG. 1 |
| 4,034,350 | 7/1977 | Kashio | 364/DIG. 2 |
| 4,064,553 | 12/1977 | Kashio | 364/DIG. 1 |
| 4,079,234 | 3/1978 | Kashio | 235/92 DE |
| 4,103,334 | 7/1978 | Kashio | 364/DIG. 2 |
| 4,133,041 | 1/1979 | Kashio | 364/DIG. 2 |
| 4,145,753 | 3/1979 | Kashio | 364/DIG. 2 |
| 5,062,074 | 10/1991 | Kleinberger | 364/DIG. 2 |

FOREIGN PATENT DOCUMENTS

| | | |
|---|---|---|
| 57-56093 | 3/1974 | Japan . |
| 57-51137 | 6/1974 | Japan . |
| 53-46689 | 10/1975 | Japan . |
| 58-46735 | 10/1975 | Japan . |
| 58-53384 | 12/1975 | Japan . |

*Primary Examiner*—Eddie P. Chan
*Attorney, Agent, or Firm*—Frishauf, Holtz, Goodman & Woodward

[57] ABSTRACT

Prior to retrieval of records from a data file, keywords, as boundary values of condition ranges, which are input as record retrieval condition ranges are sorted and arranged in a given order. Identification information indicating that boundary ranges each defined by adjacent keywords of the keywords arranged in the given order are included in the retrieval condition ranges are assigned in correspondence with the boundary ranges. Thereafter, records are retrieved in accordance with the keywords in the boundary ranges in which the identification information are assigned. Therefore, even if designated record retrieval condition ranges overlap, ranges in which records are read out from the data file are limited to required ranges, and the same records are not read out a plurality of times.

3 Claims, 21 Drawing Sheets

FLOW CHART FOR TABLE FORMING PROCESSING

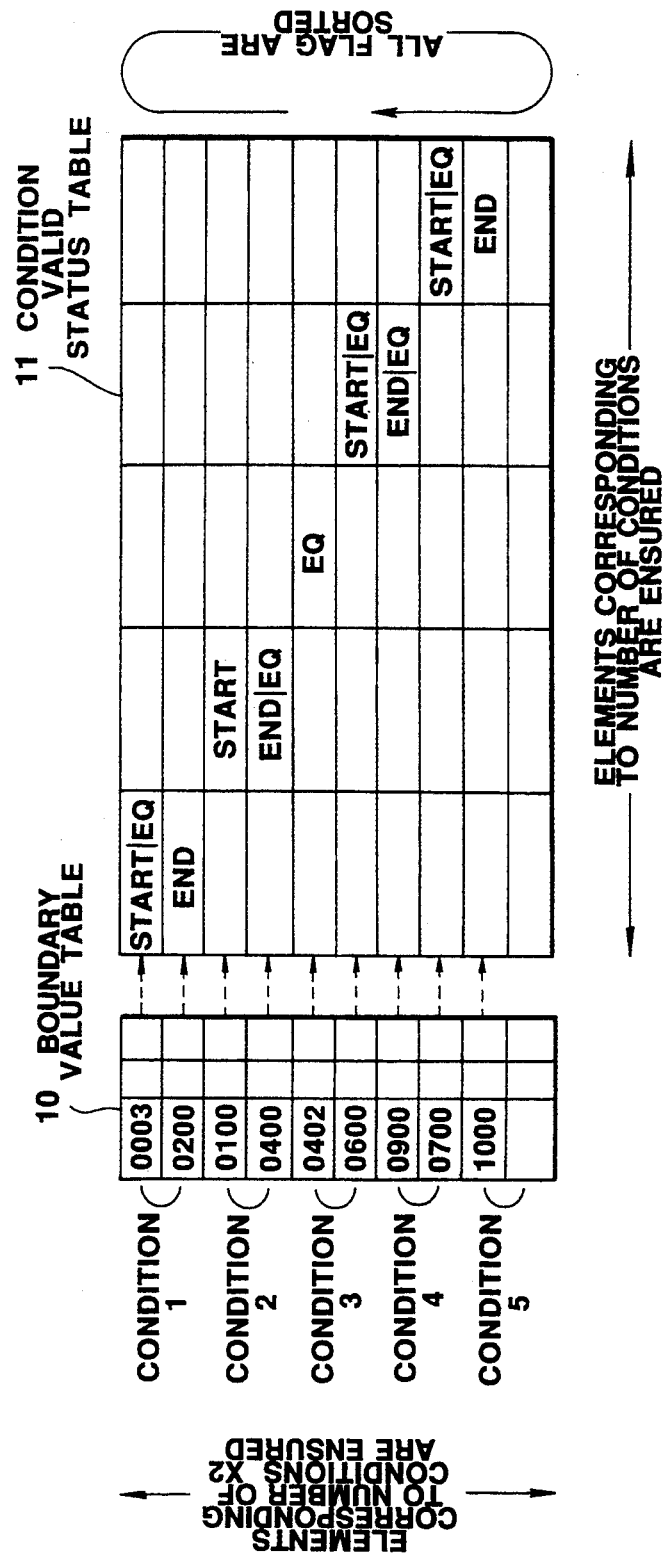

FIG. 4(C)

| | 1 | 2 | 3 | 4 | 5 |
|---|---|---|---|---|---|
| 0003 | START\|EQ | | | | |
| 0100 | END | START | | | |
| 0200 | | END\|EQ | | | |
| 0400 | | | EQ | | |
| 0402 | | | | START\|EQ | |
| 0600 | | | | END\|EQ | |
| 0700 | | | | | START\|EQ |
| 0900 | | | | | END |
| 1000 | | | | | |

FIG. 4(D)

| | | | 1 | 2 | 3 | 4 | 5 |
|---|---|---|---|---|---|---|---|
| 0003 | in | 1 | START\|EQ | | | | |
| 0100 | in | 2 | CONT | START | | | |
| 0200 | in | 1 | | CONT | | | |
| 0400 | EQ | 1 | | EQ | | | |
| 0402 | EQ | 1 | | | EQ | | |
| 0600 | in | 1 | | | | START\|EQ | |
| 0700 | in | 2 | | | | CONT | START\|EQ |
| 0900 | in | 2 | | | | EQ | CONT |
| 1000 | out | 0 | | | | | |

FLOW CHART FOR RECORD RETRIEVAL PROCESSING

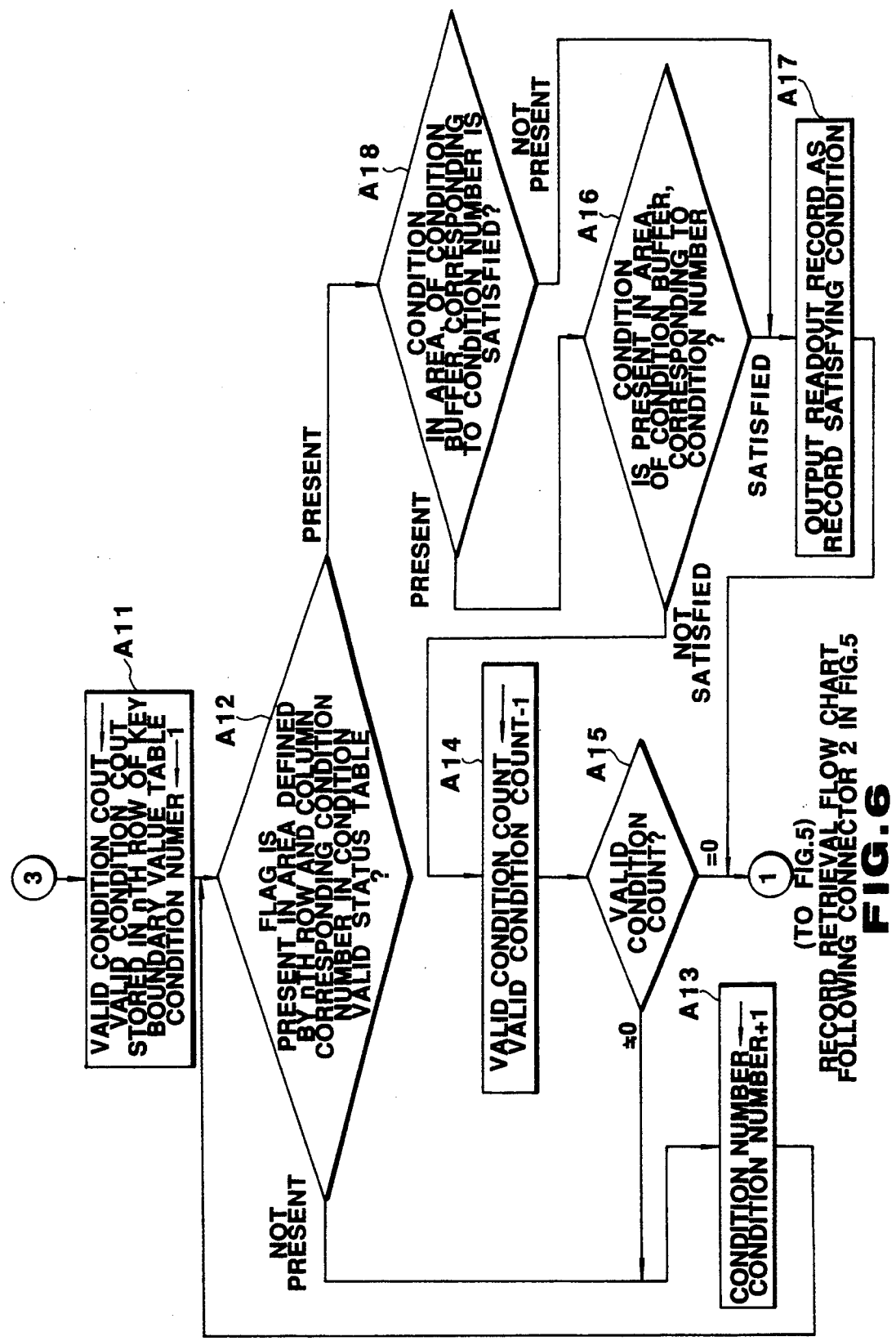

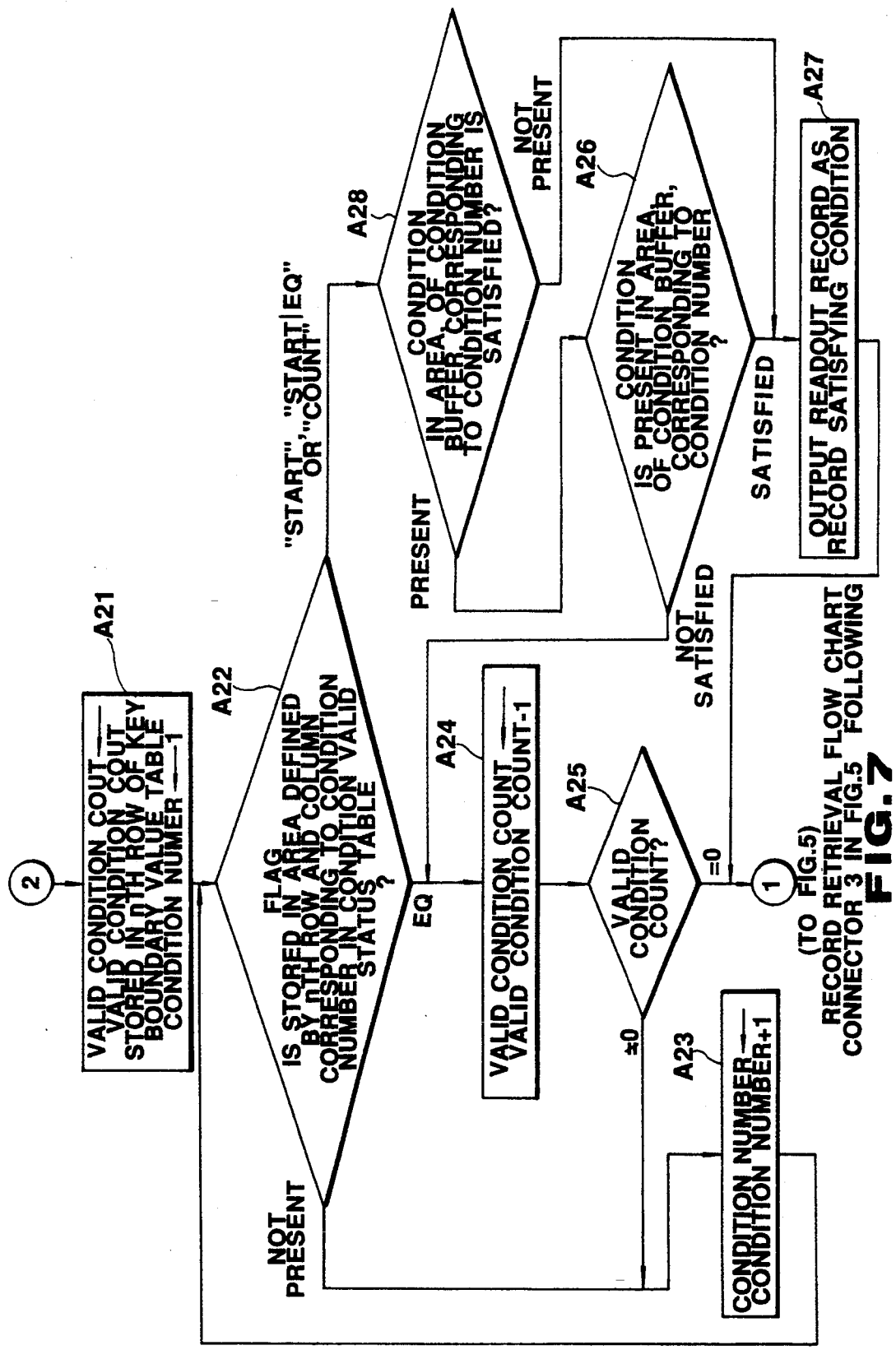

SEEK/ CONTINUOUS READ OPERATIONS IN RECORD RETRIEVAL

| | INDEX KEY | FIELD2 | FIELD3 | FIELD4 | |
|---|---|---|---|---|---|
| SEEKING BY START DATA OF BOUNDARY VALUE TABLE → | 0000 | 0000 | 0000 | 0000 | |
| | 0001 | 0000 | 0003 | 0002 | VALID RANGE OF CONDITION 1 |
| | 0002 | 0000 | 0006 | 0004 | |
| | 0003 | 0000 | 0009 | 0006 | |
| | 0004 | 0000 | 0012 | 0008 | |
| | 0100 | 0002 | 0000 | 0001 | |
| CONTINUOUS READING | 0101 | 0003 | 0003 | 0003 | |
| | 0102 | 0002 | 0006 | 0005 | |
| ☐ | 0103 | 0002 | 0009 | 0007 | VALID RANGE OF CONDITION 2 |
| | 0104 | 0002 | 0012 | 0009 | |
| | 0200 | 0004 | 0000 | 0002 | |
| | 0201 | 0004 | 0003 | 0004 | |
| | 0202 | 0004 | 0006 | 0006 | |
| | 0203 | 0004 | 0009 | 0008 | |
| | 0300 | 0006 | 0000 | 0003 | |
| SEEKING BECAUSE OF RECORD FLAG EQ | ☐ 0302 | 0006 | 0006 | 0007 | |
| | 0303 | 0006 | 0009 | 0009 | |
| | 0304 | 0006 | 0012 | 0011 | |
| | 0400 | 0008 | 0000 | 0004 | |
| | 0401 | 0008 | 0003 | 0006 | SINCE KEYWORD IS ONLY CONDITION, RETRIEVAL CONDITION IS SATISFIED |
| ☐ | 0402 | 0008 | 0006 | 0008 | |
| | 0403 | 0008 | 0009 | 0010 • | |
| | 0404 | 0008 | 0012 | 0012 | |
| | 0500 | 0010 | 0000 | 0005 | |
| | 0501 | 0010 | 0003 | 0007 | |
| | 0502 | 0010 | 0006 | 0009 | |
| | 0503 | 0010 | 0009 | 0011 | |
| | 0503 | 0010 | 0012 | 0013 | |
| | 0700 | 0014 | 0000 | 0007 | VALID RANGE OF CONDITION 4 |
| | 0701 | 0014 | 0003 | 0009 | |
| ☐ | 0702 | 0014 | 0006 | 0011 | VALID RANGE OF CONDITION 5 |
| | 0703 | 0014 | 0009 | 0013 | |
| | 0704 | 0014 | 0012 | 0015 | |
| CONTINUOUS READING | 0800 | 0016 | 0000 | 0008 | |
| | 0801 | 0016 | 0006 | 0010 | |
| ☐ | 0802 | 0016 | 0006 | 0012 | |
| | 0803 | 0016 | 0009 | 0014 | |
| | 0804 | 0016 | 0012 | 0016 | |
| | 0900 | 0018 | 0000 | 0009 | |
| ☐ | 0901 | 0018 | 0003 | 0011 | |
| | 0902 | 0018 | 0006 | 0013 | |
| | 0903 | 0018 | 0009 | 0015 | |
| | 0904 | 0018 | 0012 | 0017 | |
| | INDEX FILE | DATA FILE | | | |

FIG. 8

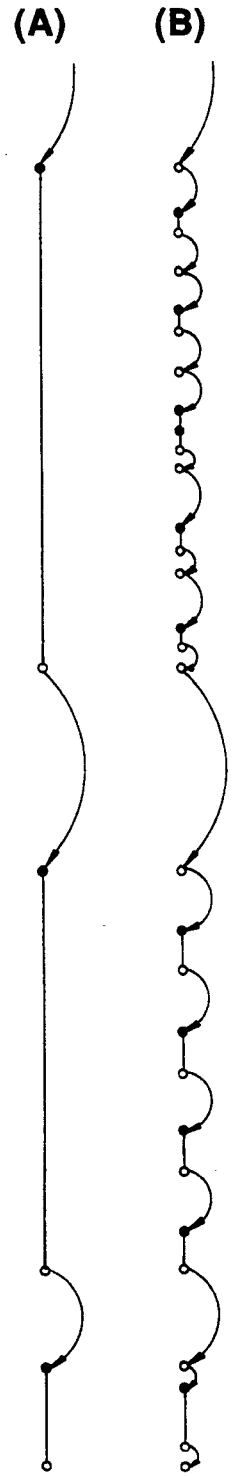
FIG. 9 SEEK/CONTINUOUS READ OPERATIONS IN RECORD RETRIEVAL

TABLE ARRANGEMENT

FLOW CHART FOR TABLE FORMING PROCESSING

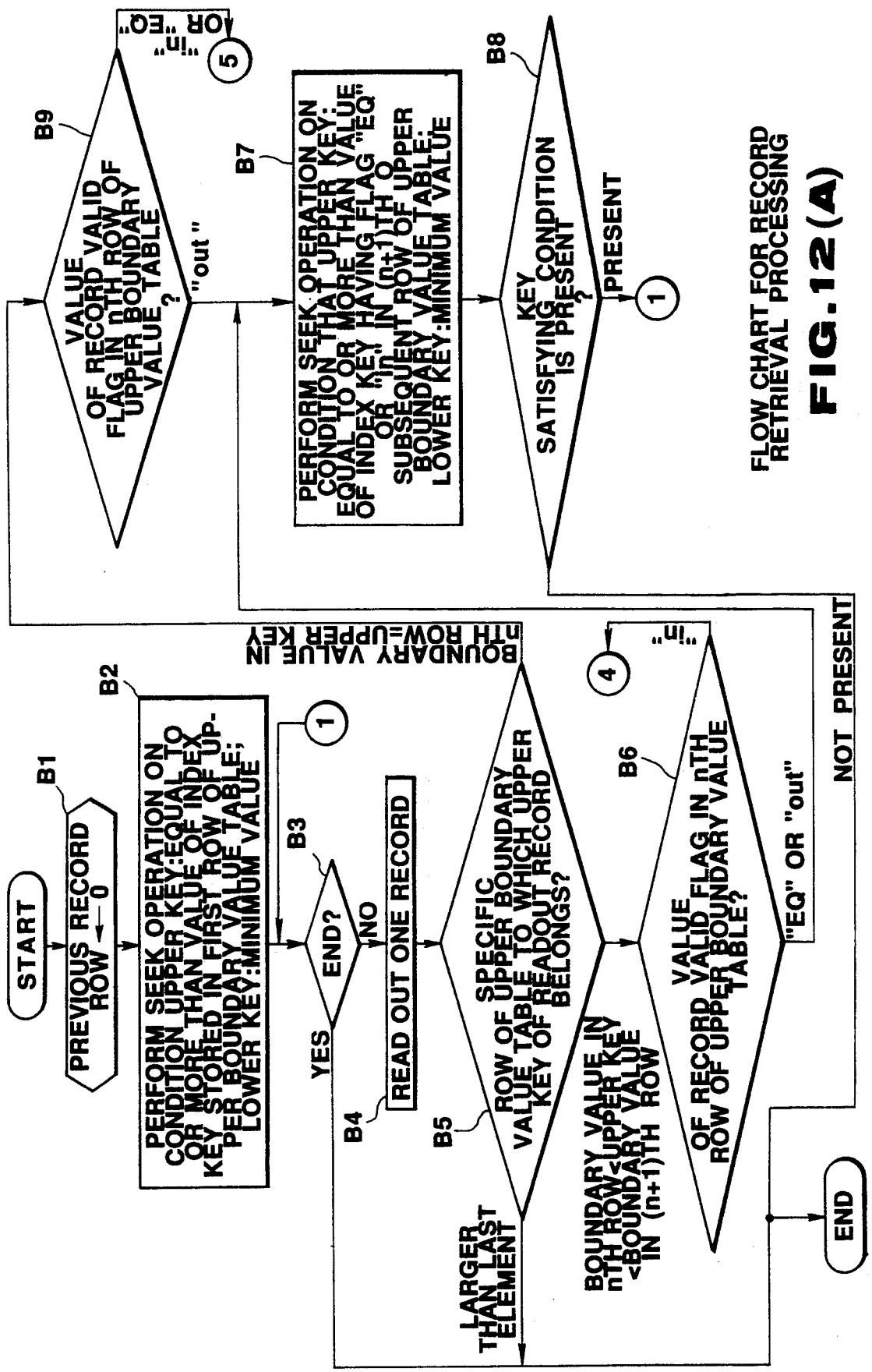

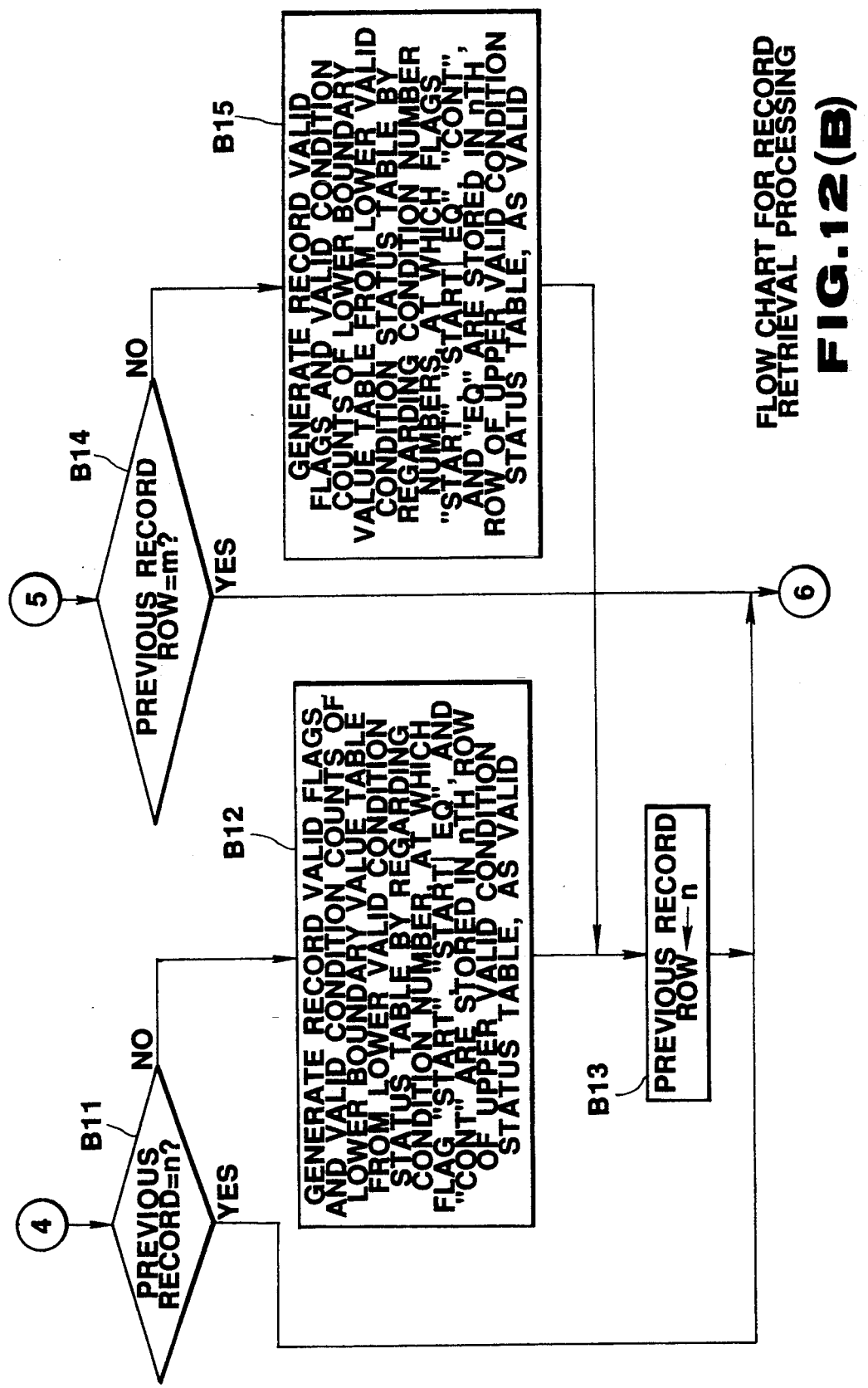
FIG. 12(B) FLOW CHART FOR RECORD RETRIEVAL PROCESSING

RECORD RETRIEVAL FLOW CHART
FOLLOWING CONNECTOR 6 IN FIG.12

| INDEX KEY | FIELD2 | FIELD3 | FIELD4 | | |
|---|---|---|---|---|---|
| 0000 | 0000 | 0000 | 0000 | | |
| 0001 | 0000 | 0003 | 0002 | | RECORDS SATISFYING CONDITION1 |
| 0002 | 0000 | 0006 | 0004 | | |
| 0003 | 0000 | 0009 | 0006 | | |
| 0004 | 0000 | 0012 | 0008 | | |
| 0100 | 0002 | 0000 | 0001 | | |
| 0101 | 0003 | 0003 | 0003 | | |
| 0102 | 0002 | 0006 | 0005 | (A) | |
| ⊚ 0103 | 0002 | 0009 | 0007 | | |
| 0104 | 0002 | 0012 | 0009 | | |
| 0200 | 0004 | 0000 | 0002 | | RECORDS SATISFYING CONDITION2 |
| 0201 | 0004 | 0003 | 0004 | (B) | |
| 0202 | 0004 | 0006 | 0006 | | |
| 0203 | 0004 | 0009 | 0008 | | |
| 0300 | 0006 | 0000 | 0003 | | |
| 0302 | 0006 | 0006 | 0007 | | |
| 0303 | 0006 | 0009 | 0009 | | |
| 0304 | 0006 | 0012 | 0011 | | |
| 0400 | 0008 | 0000 | 0004 | | |
| 0401 | 0008 | 0003 | 0006 | | RECORDS SATISFYING CONDITION3 |
| 0402 | 0008 | 0006 | 0008 | (C) | |
| 0403 | 0008 | 0009 | 0010 | | |
| 0404 | 0008 | 0012 | 0012 | | |
| 0500 | 0010 | 0000 | 0005 | | |
| 0501 | 0010 | 0003 | 0007 | | RECORDS SATISFYING CONDITION4 |
| 0502 | 0010 | 0006 | 0009 | | |
| 0503 | 0010 | 0009 | 0011 | | |
| 0503 | 0010 | 0012 | 0013 | | |
| 0700 | 0014 | 0000 | 0007 | | |
| 0701 | 0014 | 0003 | 0009 | | |
| ⊚ 0702 | 0014 | 0006 | 0011 | | |
| 0703 | 0014 | 0009 | 0013 | | |
| 0704 | 0014 | 0012 | 0015 | (D) | |
| 0800 | 0016 | 0000 | 0008 | | |
| 0801 | 0016 | 0006 | 0010 | | RECORDS SATISFYING CONDITION5 |
| 0802 | 0016 | 0006 | 0012 | | |
| 0803 | 0016 | 0009 | 0014 | | |
| 0804 | 0016 | 0012 | 0016 | (E) | |
| 0900 | 0018 | 0000 | 0009 | | |
| 0901 | 0018 | 0003 | 0011 | | |
| 0902 | 0018 | 0006 | 0013 | | |
| 0903 | 0018 | 0009 | 0015 | | |
| 0904 | 0018 | 0012 | 0017 | | |

INDEX FILE | DATA FILE

CONVENTIONAL RECORD RETRIEVAL

FIG. 18

RECORD RETRIEVAL METHOD USING KEY BONDARY VALUE TABLE AND CONDITION VALID STATUS TABLE

This application is continuation of application Ser. No. 07/661,890, filed Feb. 27, 1991, now abandoned.

BACKGROUND OF THE INVENTION

1. Field of the Invention

The present invention relates to a record retrieval method of reading out records corresponding to designated record retrieval conditions from a data file in a data processing apparatus such as an office computer.

2. Description of the Related Art

A data file, e.g., a sales file or an inventory file, and an index file are generally stored in an external storage of a data processing apparatus.

A data file has the following format. A data file is a file arbitrarily formed by a user. Records in each file are respectively identified by index keys. As shown in FIG. 17, each record has data, such as a sales quantity and a sales amount, in fields corresponding to the number of necessary items, which follow a corresponding index key. Note that the respective records in a data file are not arranged in the order of index keys but are arranged in the order of, e.g., records formed by a user. In contrast to this, in an index file, data consisting of index keys and physical addresses, of a data file, at which records corresponding to the keys are stored, are arranged in the order of the keys (increasing order or decreasing order), as shown in FIG. 17.

When desired records are to be retrieved from a data file having the above-described format by using, for example, the following conditions, high-speed record retrieval cannot be expected.

Assume that record retrieval is performed on the basis of the following OR conditions, i.e., conditions 1 to 5 designated by key words:

Condition 1: $0003 \leq$ keyword $< 0200$; field $3 = 0009$
Condition 2: $0100 <$ keyword $\leq 0400$; field $4 = 0007$
Condition 3: keyword $= 0402$
Condition 4: $0600 \leq$ keyword $\leq 0900$; field $3 = 0006$
Condition 5: $0700 \leq$ keyword $< 1000$; field $4 = 0011$ If field conditions are set in addition to keywords, record retrieval is performed as follows. The index file is accessed first to read out records having index keys corresponding to the keywords from the data file. Subsequently, records corresponding to the field conditions are selected from the records.

A conventional record retrieval method will be described in detail below with reference to FIG. 18. FIG. 18 shows an example of data indicating a correspondence between index keys sorted in the increasing order in an index file and record contents (the contents of each field), in a data file, corresponding to the index keys.

Referring to FIG. 18, reference symbols (A), (B), (C), (D), and (E) correspond to the above-mentioned record retrieval conditions "condition 1", "condition 2", "condition 3", "condition 4", and "condition 5" and denote records read out from the data file when they satisfy the respective key conditions. Note that "condition 3" includes only one key condition, but other conditions include field conditions as well as key conditions. That is, reference symbols (A), (B), (D), and (E) respectively denote record groups which satisfy the key conditions of "condition 1", "condition 2", "condition 4", and "condition 5" and are read out from the data file to check whether they satisfy other conditions (field conditions) as well.

Records, of the record group (A) read out from the data file in this manner, which satisfy the field condition of "condition 1" are records having index keys "0003" and "0103". Records which satisfy the field condition of "condition 2" are records having index keys "0103" and "0302". Records which satisfy the field condition of "condition 4" are records having index keys "0702" and "0802". In addition, records having index keys "0702" and "0901" satisfy the field condition of "condition 5".

when record retrieval is performed on the basis of "condition 1" to "condition 5" described above, however, since the ranges defined by the key conditions of "condition 1" and "condition 2" and of "condition 4" and "condition 5" overlap, records in the ranges indicated by dotted lines in FIG. 18 are read out twice for the respective different conditions. Consequently, the number of records read out from the data file is increased, and the frequency of access to an external storage is increased accordingly. This greatly interferes with high-speed processing.

In addition, the same records may be retrieved twice or more depending on the designated contents of key and field conditions. For example, a record having an index key "0103" indicated by a symbol ⊙ is retrieved twice by "condition 1" and "condition 2". A record having an index key "0702" is retrieved twice by "condition 4" and "condition 5". In such a case, in a conventional system, identical records are searched out from a retrieved record group, and unnecessary records which are retrieved twice or more are deleted. With this operation, the processing speed is decreased.

The reason why such a decrease in processing speed occurs is that record retrieval is performed by frequent access to the data file for each condition.

SUMMARY OF THE INVENTION

It is an object of the present invention to provide a record retrieval method wherein retrieval conditions are rearranged prior to retrieval, and record retrieval is subsequently performed so as not to access each record in a data file a plurality of times even if a plurality of retrieval conditions are designated.

In order to achieve the above object, according to the present invention there is provided a record retrieval method in a data processing apparatus, having a data file for storing a plurality of records respectively identified by keywords, for reading out records from the data file in accordance with designation of keywords, comprising the steps of inputting a plurality of retrieval condition ranges by setting ranges designated by boundary values of maximum and minimum values of keywords as retrieval condition ranges; sorting the keywords of the boundary values constituting the input retrieval conditions so as to arrange the keywords in a given order; assigning identification information, each indicating that a boundary range defined by adjacent keywords of the keywords arranged in the given order is included in a corresponding one of the retrieval condition ranges, in correspondence with the respective boundary ranges; and retrieving records from the data file in accordance with the keywords in the boundary ranges in which the identification information are assigned.

According to the present invention, therefore, even if a plurality of retrieval conditions are designated, each record in a data file is not accessed a plurality of times, and desired records can be retrieved at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 8 show the first embodiment of the present invention, in which;

FIG. 1 is a block diagram showing a data processing apparatus;

FIG. 2 is a view showing formats of a key boundary value table 10, a condition valid status table 11, and a field condition buffer 12;

FIG. 3 is a flow chart showing table forming processing for forming the key boundary value table 10, the condition valid status table 11, and the field condition buffer 12, FIGS. 4(A) to 4(E) are views showing a sequence of steps in forming the key boundary value table 10, the condition valid status table 11, and the field condition buffer 12 in which FIG. 4(A) shows record retrieval conditions input from keyboard, FIG. 4(B) shows the contents of a key boundary value table and a condition valid status table, FIG. 4(C) shows sorting the contents of the key boundary value table in ascending order and sorting the condition valid status table; FIG. 4(D) shows a state wherein the valid condition counts are written in the key boundary value table; and FIG. 4(E) shows the contents of the key boundary value table of the condition valid status table, and of the field condition buffer upon completion of the table forming processing;

FIGS. 5 to 7 are flow charts showing record retrieval processing, in which FIG. 6 is a flow chart following a connector ③ in FIG. 5 and FIG. 7 is a flow chart following a connector ② in FIG. 5; and FIG. 8 is a view, showing a correspondence between portions of an index file and portions of a data file, for explaining record ranges in which records are read out from the data file as target records to be retrieved;

FIGS. 9 to 16 show the second embodiment of the present invention, in which;

FIG. 9 is a view, showing a correspondence between portions of an index file and portions of a data file, for explaining record ranges in which records are read out from the data file as target records;

FIG. 10 is a view showing formats of key boundary value tables 10A and 10B, condition valid status tables 11A and 11B, and a field condition buffer 12;

FIG. 11 is a flow chart showing table forming processing;

FIGS. 12(A) and 12(B), taken together is a flowchart showing record retrieval processing;

FIG. 13 is a flow chart following a connector 6 in FIG. 12(B); and

FIGS. 14 to 16 are views each showing a state in which table contents are partially rewritten in record retrieval at a corresponding timing;

FIG. 18 is a view, showing a correspondence between portions of an index file and portions of a data file, for explaining record ranges in which records are read out from the data file as target records according to a conventional record retrieval method.

DETAILED DESCRIPTION OF THE PREFERRED EMBODIMENTS

First Embodiment

The first embodiment of the present invention will be described below with reference to FIGS. 1 to 8.

Figure 1:
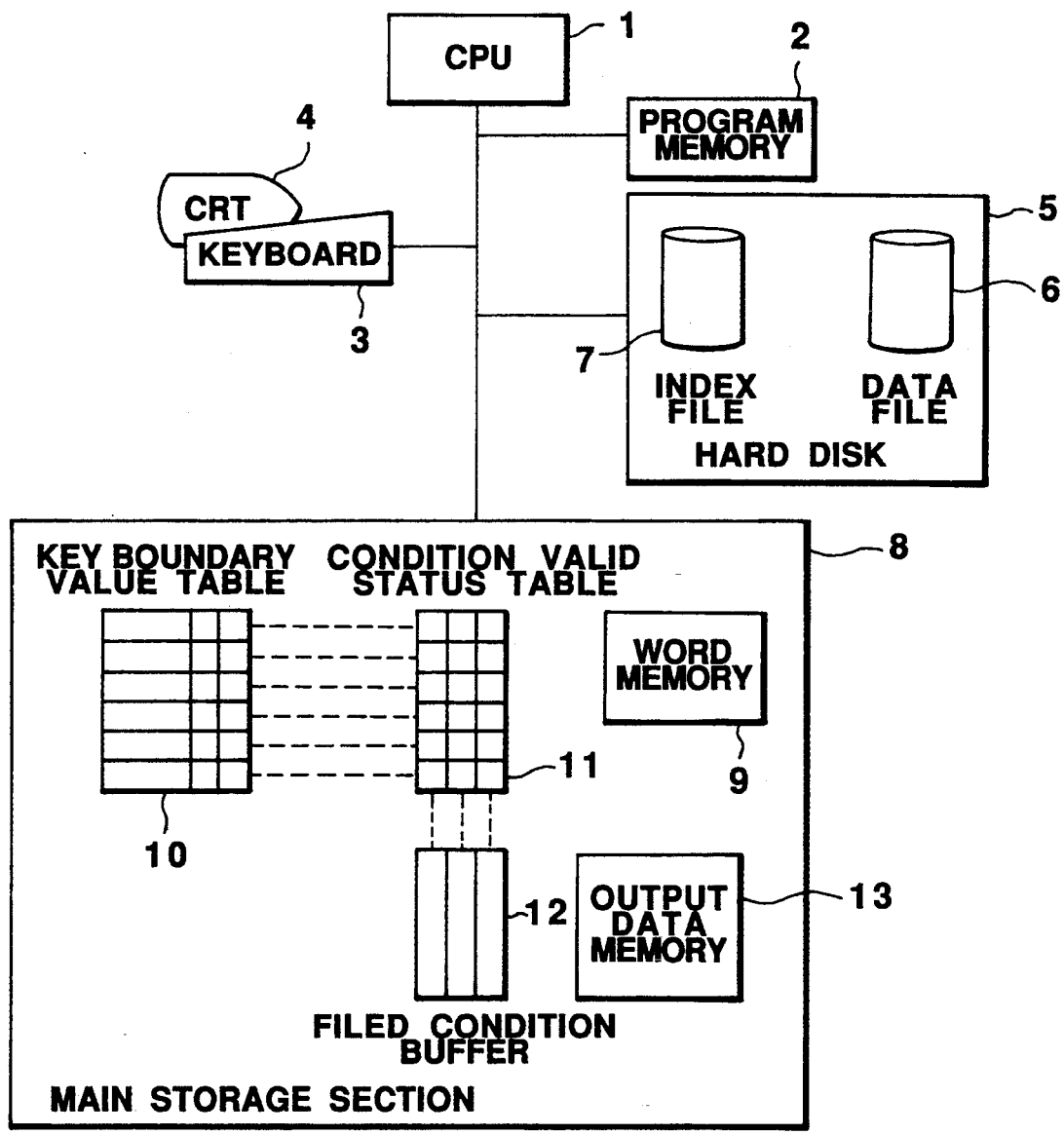

FIG. 1 is a block diagram showing a fundamental arrangement of a data processing apparatus.

A CPU 1 controls this data processing apparatus in accordance with various types of programs stored in a program memory 2, e.g., a file forming program and a record retrieval program. As peripheral devices, a keyboard 3, a CRT display section 4, and a hard disk 5 are connected to the CPU 1.

Figure 17:
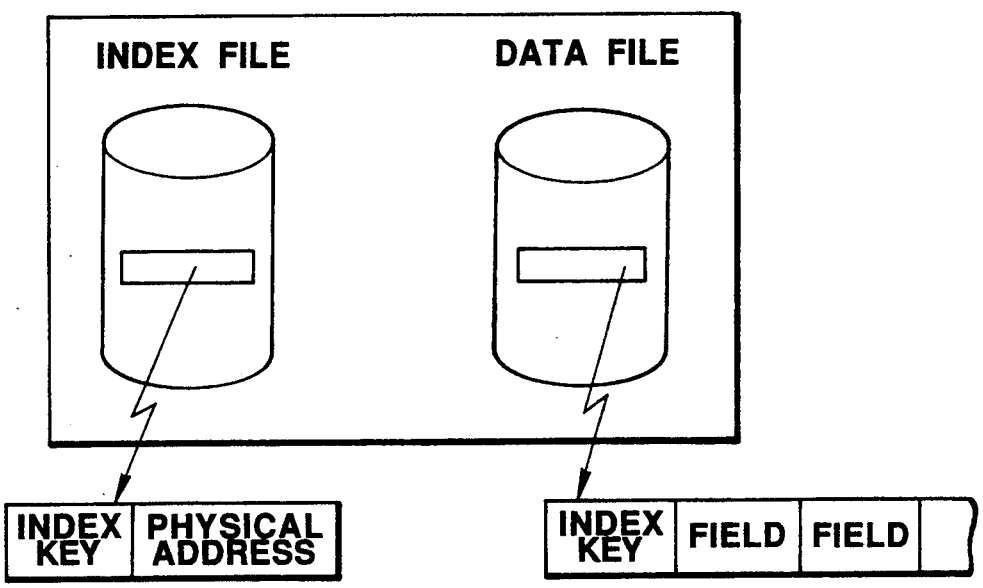
FIG. 17 is a view for explaining an index file and a data file.

The keyboard 3 is a key-input unit for inputting various data and commands. Records which are input by means of the keyboard 3 in file forming processing are stored in a data file 6 in the hard disk 5. In this hard disk 5, an index file 7 is arranged in correspondence with the data file 6. When records are added to or deleted from the data file 6, the contents of the index film 7 are updated accordingly. Note that the fundamental formats of the data file 6 and the index file 7 are the same as those described with reference to FIG. 17. That is, the respective records in the data file 6 are arranged in the order in which they are formed, and the data in the index file 7 are arranged in the order of keys.

When record retrieval conditions are input by the keyboard 3, the CPU 1 temporarily stores them in a work area 9 in a main storage section (RAM) 8 and subsequently forms the following tables for record retrieval in the main storage section 8 on the basis of the record retrieval conditions: a key boundary value table 10, a condition valid status table 11, and a field condition buffer 12. The CPU 1 then performs record retrieval by referring to the key boundary value table 10, the condition valid status table 11, and the field condition buffer 12. In this case, the CPU 1 accesses the index file 7 by referring to the key boundary value table. 10 and the condition valid status table 11, and reads out records corresponding to key conditions from the data file 6. Thereafter, the CPU 1 selects records corresponding to field conditions by referring to the field condition buffer 12. The CPU 1 writes the selected records in an output data memory 13 in the main storage section 8, and causes the CRT display section 4 to display the records.

The formats of the key-boundary value table 10, the condition valid status table 11, and the field condition buffer 12 will be described below with reference to FIG. 2.

In this case, the record formats of target files from which records are to be retrieved (the data file 6 and the index file 7) are the same as those in the prior art described with reference to FIG. 18. In addition, assume that the following OR conditions as record retrieval conditions identical to those in the prior art are used:

Condition 1: 0003≦keyword<0200; field 3=0009
Condition 2: 0100<keyword≦0400; field 4=0007
Condition 3: keyword=0402
Condition 4: 0600≦keyword≦0900; field 3=0006
Condition 5: 0700≦keyword<1000; field 4=0011

Figure 2:
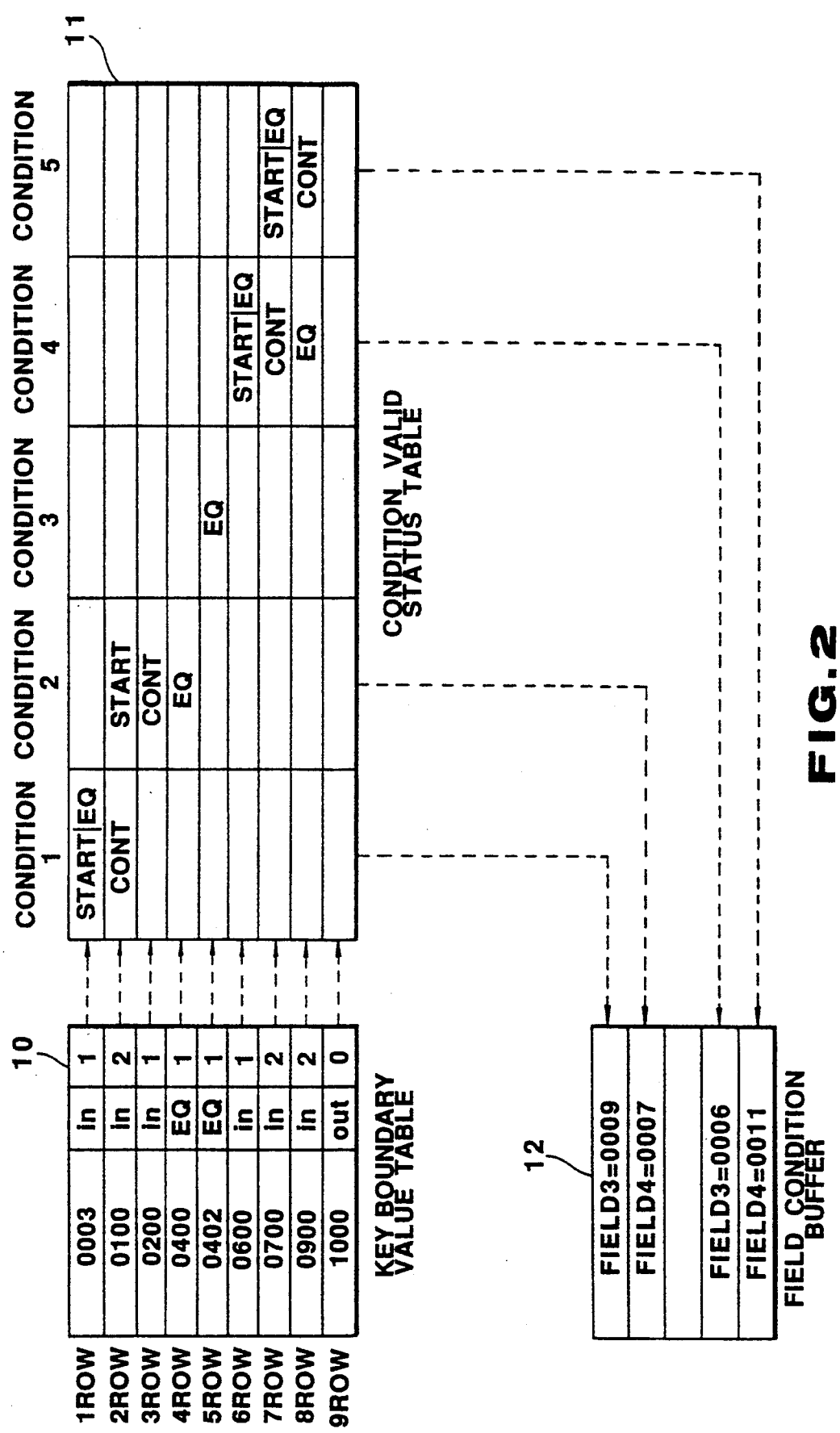

FIG. 2 shows the contents of the key boundary value table 10, the condition valid status table 11, and the field condition buffer 12 which are formed on the basis of the above conditions.

Each row of the key boundary value table 10 has three columns. The boundary values of keywords included in the respective retrieval conditions (e.g., "0003" and "0200" in "condition 1", and "0100" and "0400" in "condition 2") are arranged and stored in areas defined by the first column and the respective rows in the increasing order. Record valid flags are stored in areas defined by the second column and the respective rows. A record valid flag in a given row represents whether records included in a boundary range from a keyword boundary value in the same row (inclusive) to a keyword boundary value in the next row (exclusive) are valid as target records to be read for retrieval. For example, in the first row, a record valid flag represents the validity of records which fall within the range of "0003" (inclusive) to "0100" (exclusive). In this case, the following three types of flags are used as record valid flags:

- in: indicating that records having keywords within a corresponding boundary range are target records to be read
- out: indicating that records having keywords within a corresponding boundary range are not target records to be read
- EQ: indicating that only a record having a keyword equal to the lower limit (boundary value) of a corresponding boundary range is a target record to be read out For example, the flag "in" set in the first row of the key boundary value table 10 represents that records having keywords within the range of "0003" (inclusive) to "0100" (exclusive) are target records to be read for retrieval. In addition, the flag "EQ" set in the fifth row represents that only a record having a keyword equal to "0402" is a target record, but records having keywords within the range of "0402" (exclusive) to "0600" (exclusive) are not target records.

Valid condition counts are respectively stored in areas defined by the third column and the respective rows in the key boundary value table 10. A valid condition count indicates the number of record retrieval conditions designated in a boundary range of a corresponding record valid flag. For example, since only "condition 1" is designated within the range of "0003" (inclusive) to "0100" (exclusive), the valid condition count in this range is "1". In the range of "0100" (inclusive) to "0200" (exclusive), "condition 1" and "condition 2" are designated, and hence the valid condition count in this range is "2".

The condition valid status table 11 has the following arrangement.

The condition valid status table 11 has a matrix format in which the rows respectively correspond to the rows of the key boundary value table 10, and the columns respectively correspond to the designated conditions, i.e., "condition 1", "condition 2", "condition 3", "condition 4", and "condition 5". The condition valid status table 11 serves to store flags each representing the validity of a specific retrieval condition in a specific boundary range of keywords. More specifically, a flag which is stored in an area at the intersection of the mth row and the nth column (m and n are integers of 1 or more) in the table 11 represents whether a condition corresponding to the nth column in the table 11 is valid for record retrieval in the boundary range of the mth row to the (m+1)th row in the key boundary value table 10. In this case, the following four types of flags are stored in the condition valid status table 11:

- START: representing that a condition becomes valid from a corresponding boundary range (the lower limit of the range is not included in the valid range)
- START| EQ: representing that a condition becomes valid from a corresponding boundary range (the lower limit of the range is included in the valid range)
- CONT: representing that a condition has been valid within a corresponding boundary range
- EQ: representing that a condition is valid at only the lower limit of a corresponding boundary range For example, the first column in the condition valid status table 11 represents the valid range of "condition 1". That is, the valid range is defined by the value of the first row (inclusive) to the value of the third row (exclusive) of the key boundary value table 10 ("0003" (inclusive) to "0200" (exclusive)). The third column of the table 11 represents that only a record having a keyword equal to "0402" in the fifth row of the table 10 is valid.

The field condition buffer 12 is a table for storing conditions (field conditions), of the respective retrieval conditions, other than conditions associated with keywords. Field conditions are stored in the buffer 12 in correspondence with the respective rows of the condition valid status table 11.

An operation of the first embodiment will be described below with reference to FIGS. 3 to 8.

Table forming processing

Prior to record retrieval, the CPU 1 performs table forming processing to form the key boundary value table 10, the condition valid status table 11, and the field condition buffer 12 in the main storage section 8.

Figure 3:
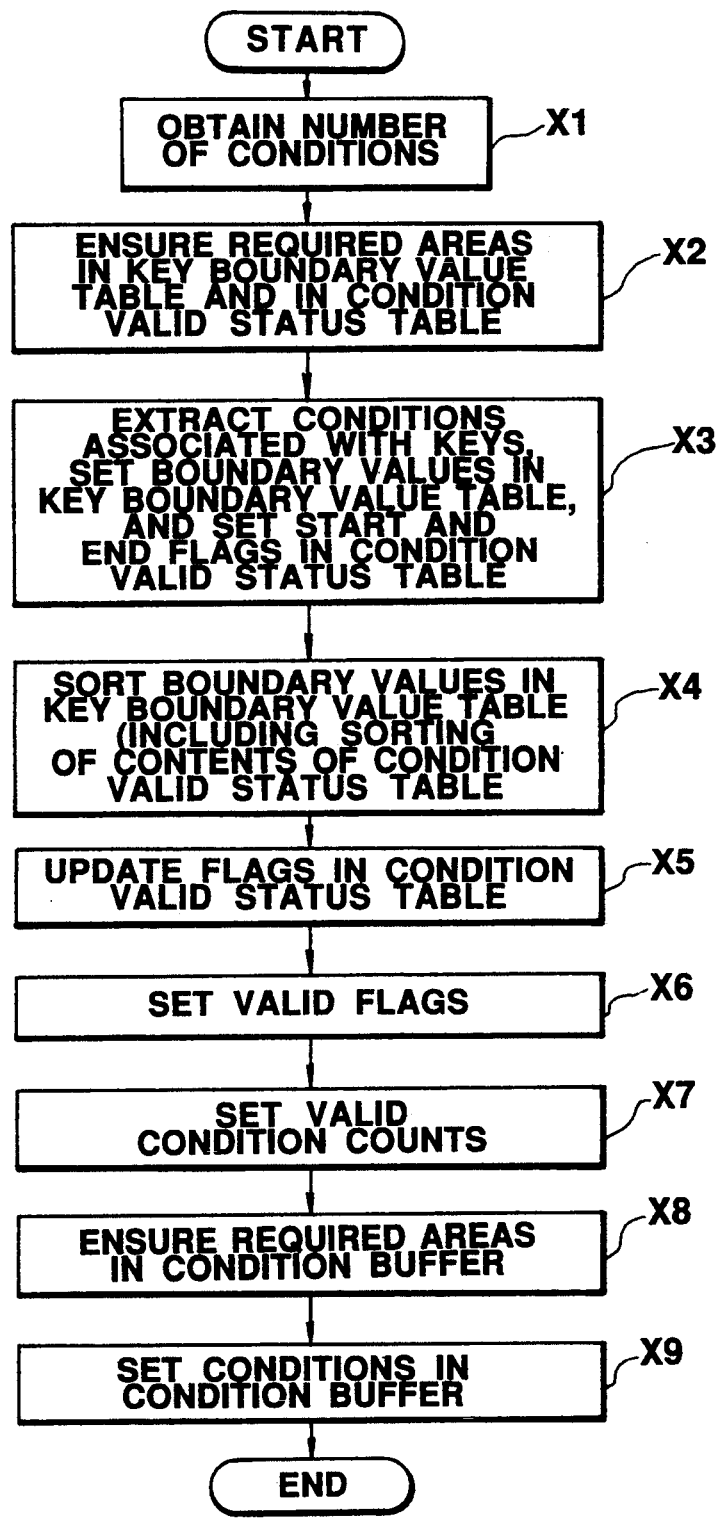

FIG. 3 is a flow chart showing table forming processing. FIGS. 4(A) to 4(E) show a sequence of steps in forming tables.

Assume that record retrieval conditions ("condition 1" to "condition 5") which are input/designated by the keyboard 3 are stored in the work area 9, as shown in FIG. 4(A).

When table forming processing is started in this state, the number of conditions stored in the work area 9 is obtained (step X1). Row areas corresponding to twice the number of conditions are ensured in the row direction of the key boundary value table 10 and the condition valid status table 11. In addition, column areas corresponding to the number of conditions are ensured in the column direction of the condition valid status table 11 (step X2). In this case, since boundary values, valid flags, and valid condition counts are arranged in the respective rows of the key boundary value table 10 in units of columns, the key boundary value table 10 is formed into a 10×3 matrix. The condition valid status table 11 is formed into a 10×5 matrix.

Subsequently, conditions associated with keys are extracted from the respective conditions, and the boundary values of keywords are sequentially written in the key boundary value table 10 in units of rows. Start and end flags, of condition valid ranges, represented by inequality symbols and the like are written in corresponding portions of the condition valid status table 11 (step X3). FIG. 4(B) shows the contents of the key boundary value table 10 and the condition valid status table 11 in this case. Note that start and end flags include a start flag "START| EQ" representing "≦", an end flag "END" representing "<", a start flag "START" representing "<", and an end flag "END| EQ" representing "<" and a flag "EQ" representing "=".

The flow then advances to step X4 to sort the contents of the key boundary value table 10 in the ascending order and to sort the contents of the condition valid status table 11 accordingly. FIG. 4(C) shows this state. After the contents of the key boundary value table 10 and of the condition valid status table 11 are sorted in this manner, the contents of the condition valid status table 11 are updated in accordance with the following rules (step X5).

That is, the condition valid status table 11 is searched in units of columns, and flags "CONT" are written in free areas in the interval between the flag "START" or "START| EQ" and the flag "EQ", "END", or "END| EQ". With this operation, the flags "CONT" are written in the free areas defined by the first column and the second row, and the second column and the third row. Assume that the condition valid status table 11 is searched in units of rows. In this case, if only the flag "END" is present in a given row, the flag is deleted. If only the flag "END| EQ" is present in a given row, the flag is converted into the flag "EQ". For this reason, the flags "END" in the third and ninth rows are deleted, and the flags "END| EQ" in the fourth and eighth rows are converted into the flags "EQ".

The flow then advances to step X6 to write record valid flags in the key boundary value table 10 in accordance with the contents of the condition valid status table 11. In this case, the condition valid status table 11 is searched in units of rows, and record valid flags are set in accordance with the following rules.

That is, if no flags are set in a given row of the key boundary value table 10, a record valid flag "out" is written in an area of the key boundary value table 10 which corresponds to the given row. If only the flag "EQ" is set in a given row of the condition valid status table 11, the record valid flag "EQ" is written in an area of the key boundary value table 10 which corresponds to the given row. Furthermore, if some of the flags "EQ", "START| EQ", "START", and "CONT" are set together, or at least one of the flags "START| EQ" and "CONT" is set in a given row of the condition valid status table 11, the record valid flag "in" is written in an area of the key boundary value table 10 which corresponds to the given row. As a result, the record valid flags "in", "in", "EQ", "EQ", . . . "out" are sequentially set in the respective rows from the first row, as shown in FIG. 4(D).

Subsequently, valid condition counts are written in the key boundary value table 10 (step X7). In this case, the condition valid status table 11 is searched in units of rows to count the number of flags set in the respective rows, and the count values are respectively written in the areas of the key boundary value table 10 which correspond to the rows of the table 11. As a result, valid condition counts "1", "2", "1", "1", "1", . . . "0" are sequentially written in the respective rows from the first row, as shown in FIG. 4(D).

Figure 4E:
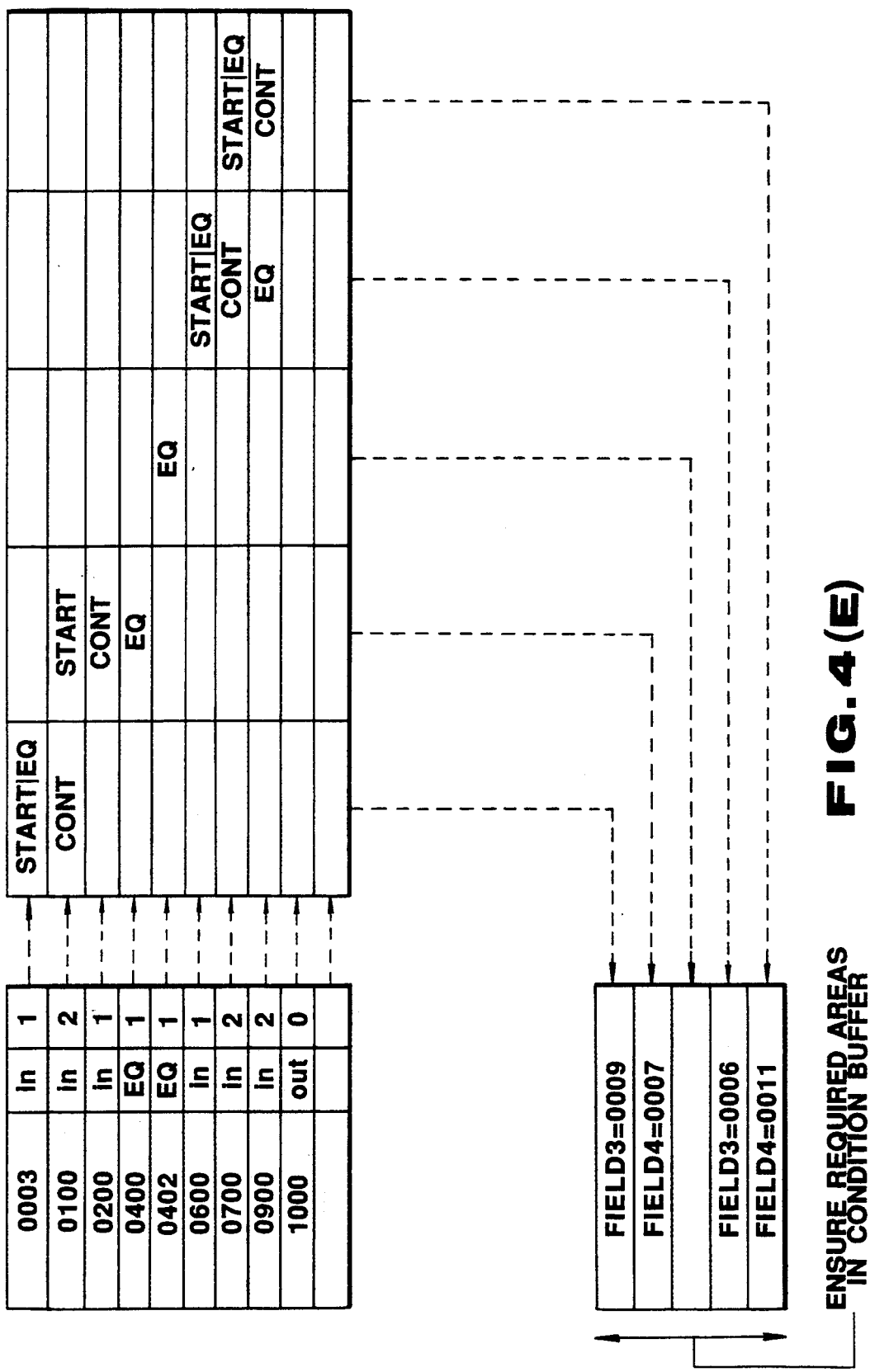

With this processing, the key boundary value table 10 and the condition valid status table 11 are formed. The flow then advances to the next step to form the field condition buffer 12 (steps x8 and X9). First, areas corresponding to the number of conditions are ensured in the field condition buffer 12 (step X8). Conditions (field conditions) other than key conditions are extracted from the respective conditions and are written in the field condition buffer 12 in correspondence with the respective columns of the condition valid status table 11 (step X9).

with this operation, the table forming processing is completed. FIG. 4(E) shows the contents of the key boundary value table 10, of the condition valid status table 11, and of the field condition buffer 12 upon completion of the table forming processing.

Record retrieval processing

Figure 5:
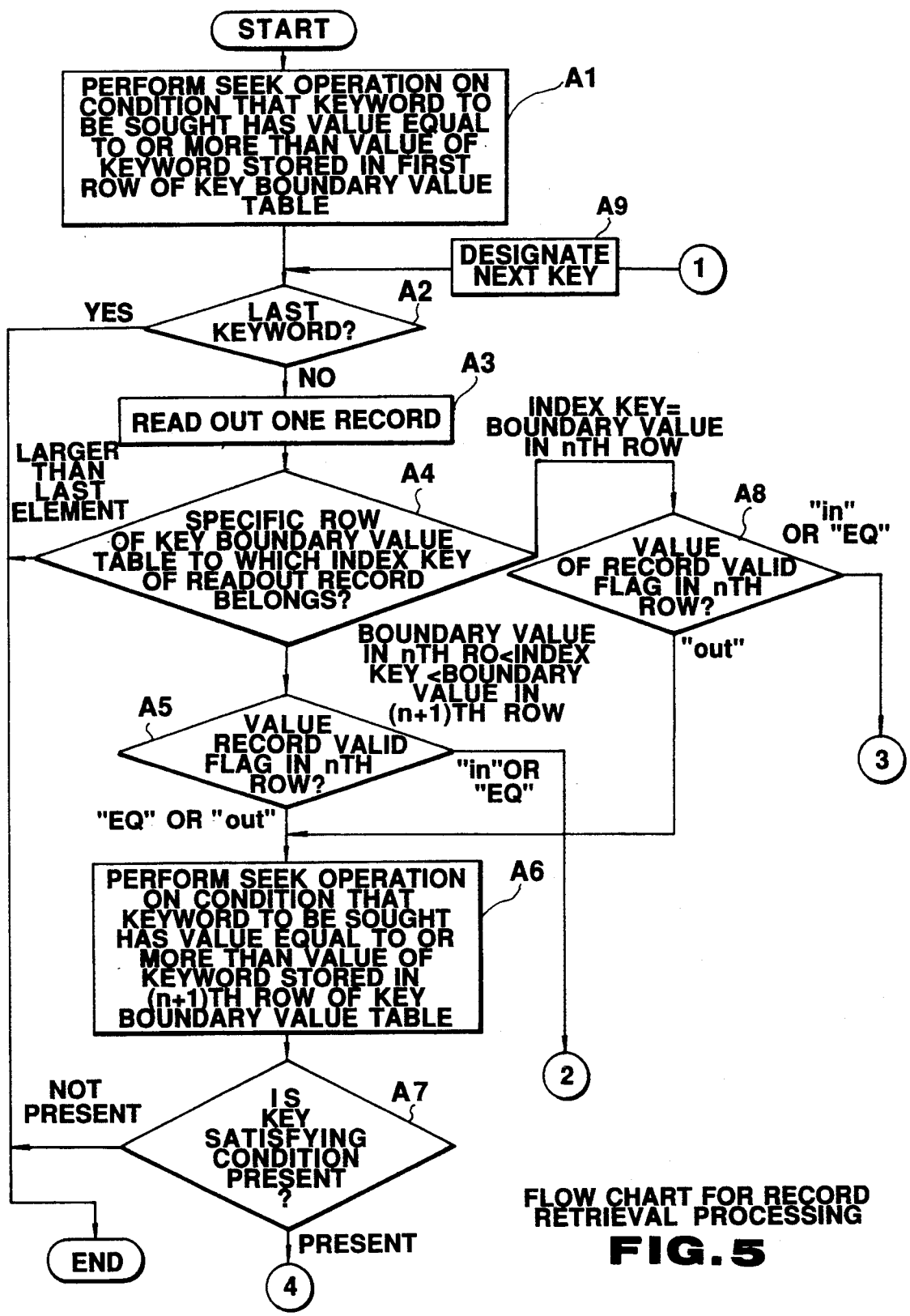

When the respective types of tables are formed in the main storage section 8 in the above-described manner, the CPU 1 executes record retrieval processing in accordance with flow charts shown in FIGS. 5 to 7. FIG. 6 is a flow chart following a connector ③ in FIG. 5. FIG. 7 is a flow chart following a connector ② in FIG. 5. Both the flow charts are used to perform substantially the same processing in terms of contents. FIG. 8 shows an example of data indicating a correspondence between index keys sorted in the increasing order in the index file and record contents (field contents) in the data file 6.

When record retrieval processing is started, the index file 7 is searched for keywords each having a value equal to or more than the value of a keyword stored in the first row of the key boundary value is read out and table 10, and a seek operation is performed up to a key position at which a keyword having a value equal to or more than that of the keyword in the first row is stored (step A1). More specifically, a keyword "0003" stored in the first row of the key boundary value table is read out and the read pointer value of the index file 7 is shifted to a key position at which a key having a value equal to the keyword "0003" or more is stored. It is then checked whether an index key is stored at a designated position, i.e., whether processing is completed up to the final index key in the index file 7 (step A2). If the processing is not completed, the data file 6 is accessed by using a physical address read out from a designated position in the index file 7 so as to read out one-record data from the data file 6 (step A3).

With this operation, a record having the keyword "0003" stored in the first row of the key boundary value table 10 is read out from the data file 6. The readout record is subjected to the following processing.

A specific row of the key boundary value table 10 to which the index key of the readout record belongs is checked (step A4). In this case, since the index key "0003" is equal to the boundary value stored in the first row of the key boundary value table 10, the flow advances to step A8 to read out a record valid flag, in the key boundary value table 10, corresponding to an nth row, i.e., the first row, and to check whether the record valid flag is "in" or "EQ", or "out".

In this case, the record valid flag "in" is set in the first row of the key boundary value table 10 so that records having index keys within the boundary range of the keyword "0003" (inclusive) to the keyword "0100" (exclusive) are target records to be read out. Therefore, the flow advances to the flow chart following the connector 3 in FIG. 6. Note that the processing shown in FIG. 6 is performed to check whether the readout record satisfies one of "condition 1" to condition 5" and to write the record in the output data memory 13 as a corresponding record if it satisfies one of the conditions.

A valid condition count stored in the nth row of the key boundary value table 10 is fetched and set in a work register (not shown) in the CPU 1. At the same time, "1" is set, as the initial value of a condition number, in another work register in the CPU 1 (step A11).

The flow then advances to step A12 to check whether a status flag is set in an area, in the nth row of the condition valid status table 11, which is designated when a column of the table 11 is designated by the condition number in the above-mentioned work register. If NO in step A12, the flow advances to step A13 to increment the condition number in the CPU 1 by one. The flow then returns to step A12. Subsequently, the condition number is repeatedly updated until a status flag is detected. In this case, if a record valid flag in the key boundary value table 10 is not "out", one or more status flags are set in a corresponding row of the condition valid status table 11. In addition, since the flow chart in FIG. 6 is executed on a condition that a record valid flag is not "out", a flag is detected without an exception by repeatedly updating the condition number.

In this case, since the flag "START| EQ" is stored in an area defined by the first row and the first column in the condition valid status table 11, a flag is detected in step A12 when the condition number is "1".

When the condition number at which a flag is stored in the condition valid status table 11 is detected in this manner, it is checked whether a condition is stored in an area of the field condition buffer 12 which corresponds to the condition number (step A18). In this case, if no field condition is present, since it means that only a key condition corresponds to the condition number, the readout record is written, as a valid record, in the output data memory 13 (step A17). If a field condition is present, it is checked whether the readout record satisfies the field condition (step A16). If it is determined that the condition is not satisfied, a decrement operation (step A14) is performed to subtract "1" from the valid condition count in the CPU 1. If the resultant value is not "0", this state is detected in step A15, and the flow advances to step A13 to increment the condition number in the CPU 1. Thereafter, the flow advances to step A12. Subsequently, the above-described processing is repeated until the valid condition count becomes "0". That is, even if a field condition is present, if it is not satisfied, the condition number is updated to designate the next condition. If none of the conditions are satisfied, a valid condition count "0" is detected in step A15. As a result, the flow in FIG. 6 is ended and the corresponding record is neglected.

In this case, since the readout record satisfies the field condition of "condition 1", it is written in the output data memory 13 as a valid record (step A17). Thereafter, the flow advances to step A9 in FIG. 5.

When processing of one-record data is completed in this manner, the next position in the index file 7 is designated. If this position is not the final position (step A2), a physical address corresponding to the position is read out from the index file 7, and one-record data is read out from the data file 6 (step A3).

As a result, a record having an index key "0004" is read out from the data file 6. In this case, since the keyword "0004" is preset between a boundary value "0003" in the first row and a boundary value "0100" in the second row in the key boundary value table 10, "boundary value in nth row<index key<boundary value in (n+1)th row" is detected. The flow then advances to step A5 to check whether a record valid flag set in the nth row of the key boundary value table 10 is "in", or "EQ" or "out". In this case, since the record valid flag in the first row is "in", the flow advances to the step following the connector ② in FIG. 7. That is, if the index key of the readout record is equal to a boundary value stored in the key boundary value table 10, the flow advances to the flow chart in FIG. 6, and if it is not equal to the boundary value, the flow advances to the flow chart in FIG. 7.

Note that the flow chart in FIG. 6 is executed when a record valid flag is "in" or "EQ", and that the flow chart in FIG. 7 is executed only when the record valid flag is "in". However, since the record valid flag "EQ" is set only when one key condition is present, and its value becomes a boundary value without an exception, the flag "EQ" is not used as a condition to shift to the flow chart in FIG. 7.

Since steps A21 to A28 in FIG. 7 correspond to steps A11 to A18 in FIG. 4, a description thereof will be omitted except for the following point. In step A12 in FIG. 6, the presence/absence of a status flag is simply checked. In step A22 corresponding to step A12, the type of flag is checked. The type of flag is checked to neglect the status flag "EQ" and treat it as a flag representing that a condition is not satisfied. However, steps A12 and A22 are substantially equivalent to each other.

In this case, since the record having the index key "0004" is read out, the valid condition count "1" in the first row of the key boundary value table 10 is set in the work register in the CPU 1 (step A21). Since the flag "START| EQ" is stored in the area defined by the first row and the first column in the condition valid status table 11, it is checked whether the field condition of "condition 1" is satisfied. In this case, since "not satisfied" is detected (step A26), the valid condition count is decremented (step A24). Since the valid condition count becomes "0" at this time, this record is neglected. The flow then advances to step A9 in FIG. 3.

Subsequently, a record having an index key "0100" is read out from the data file 6. Since the index key "0100" is equal to a boundary value stored in the second row of the key boundary value table 10, and the record valid flag "in" is stored in the second row, the flow advances to the flow chart in FIG. 6. In this case, although status flags are respectively stored in areas defined by the second row and the first column and by the second row and the second column of the condition valid status table 11, the field conditions of "condition 1" and "condition 2" are both not satisfied (step A16). A valid condition count (initial value: "2") set in the second row in the CPU 1 is decremented every time "the field condition is not satisfied" is detected when the valid condition count becomes "0", the record is omitted from this flow of processing. Therefore, the readout record in this case is neglected.

Since such an operation is repeated in units of records, records are continuously read out one by one until a record having an index key "0400" is read out. When a record having an index key "0103" is read out, although this record satisfies "condition 1" and "condition 2", if "condition 1" is satisfied, the record is written in the output data memory 13 as a valid record regardless of whether or not it satisfies other conditions. In addition, a record having an index key "0302" satisfies "condition 2" and hence is written in the output data memory 13 as a valid record.

Another operation will be described below, in which a record having an index key "0401" is read out from the data file 6.

In this case, the record having the index key "0401" falls within the range of a boundary value "0400" in the fourth row to a boundary value "0402" in the fifth row of the key boundary value table 10. The record valid flag "EQ" is set in the fourth row of the key boundary value table 10. Therefore, the record having the index key "0401" different from the boundary value in the fourth row is regarded as an invalid record. In addition, since records having index keys within the range of the boundary value of the current record to the boundary value "0402" of the next row of the key boundary value table 10 are regarded as invalid records, if the record valid flag "EQ" is detected in step A5, the flow advances to step A6 to perform a seek operation up to an index key equal to or more than a keyword stored in the (n+1)th row of the key boundary value table 10. It is then checked whether a key satisfying the condition is present (step A7). If YES in step A7, the flow returns to step A3.

When a record having the index key "0402" is read out from the data file 6, since this index key "0402" is equal to a boundary value in the fifth row of the key boundary value table 10, the flow advances to the flow chart in FIG. 6. In this case, although a flag is set in an area defined by the fifth row and the third column of the condition valid status table 11, since no field condition is included in "condition 3", the record is written, as a valid record, in the output data memory 13 regardless of whether or not it satisfies other conditions.

A record having an index key "0403" is read out from the data file 6. Since this index key falls within the range of a boundary value in the fifth row to a boundary value in the sixth row, and the record valid flag "EQ" is set in the fifth row, all records including the current record having index keys equal to or more than a boundary value "0600" in the next row are regarded as invalid records as in the above-described case. Therefore, a seek operation is performed up to the position of an index key equal to "0600" or more in step A6. As a result, index keys are skipped to the position of the index key "0700", as shown in FIG. 8.

Subsequently, the above-described operation is repeated until the final position of the index file 7 is detected in step A2.

As described above, in this embodiment, when record retrieval is designated on the basis of the OR conditions, i.e., "condition 1" to "condition 5", even if key valid ranges of the respective conditions overlap, as shown in FIG. 8, records in the overlapping ranges are read out only once. In addition, all records falling outside the key valid ranges are skipped. Note that a symbol □ in FIG. 8 denotes a record, of the records read out in the above-described manner, which satisfies one of "condition 1" to "condition 5" and is stored in the output data memory 13. In this case, although the record having the index key "0103" satisfies "condition 2" as well as "condition 1", this record is not stored in the output data memory 13 twice or more.

Second Embodiment

The second embodiment of the present invention will be described below with reference to FIGS. 9 to 16.

In the first embodiment, a keyword is constituted by a single field. In the second embodiment, however, a keyword is constituted by two fields, and record retrieval is performed by AND conditions of upper keywords (upper keys) and lower keywords (lower keys), as shown in FIG. 9.

FIG. 9 shows the contents of an index file 7 and of a data file 6 in this case. Similar to FIG. 8, FIG. 9 shows an example of data indicating a correspondence between keywords (upper and lower keys) sorted in the increasing order in the index file 7 and the record contents (field contents) of the data file 6. In the index file 7, the lower keys belonging to the upper keys stored in the increasing order are also sorted in the increasing order in the respective ranges.

A keyword constituted by two fields is defined by the AND of upper and lower keys.

Assume that record retrieval is performed by using a keyword consisting of only an upper key while a lower key is regarded as a normal field key included in a record. In this case, record retrieval can be performed in the same manner as in the first embodiment. However, as described with reference to the first embodiment, whether a field condition is satisfied or not can be checked only after a corresponding record is read out from the data file 6. If records are read out on the basis of only upper keys, a large number of unnecessary records which do not satisfy the AND conditions of upper and lower keys are read out.

In this embodiment, therefore, key boundary value tables and condition valid status tables corresponding to the number of fields constituting a keyword are formed so that a read operation of target records is controlled by the AND conditions of upper and lower keys constituting the keywords.

Figure 10:
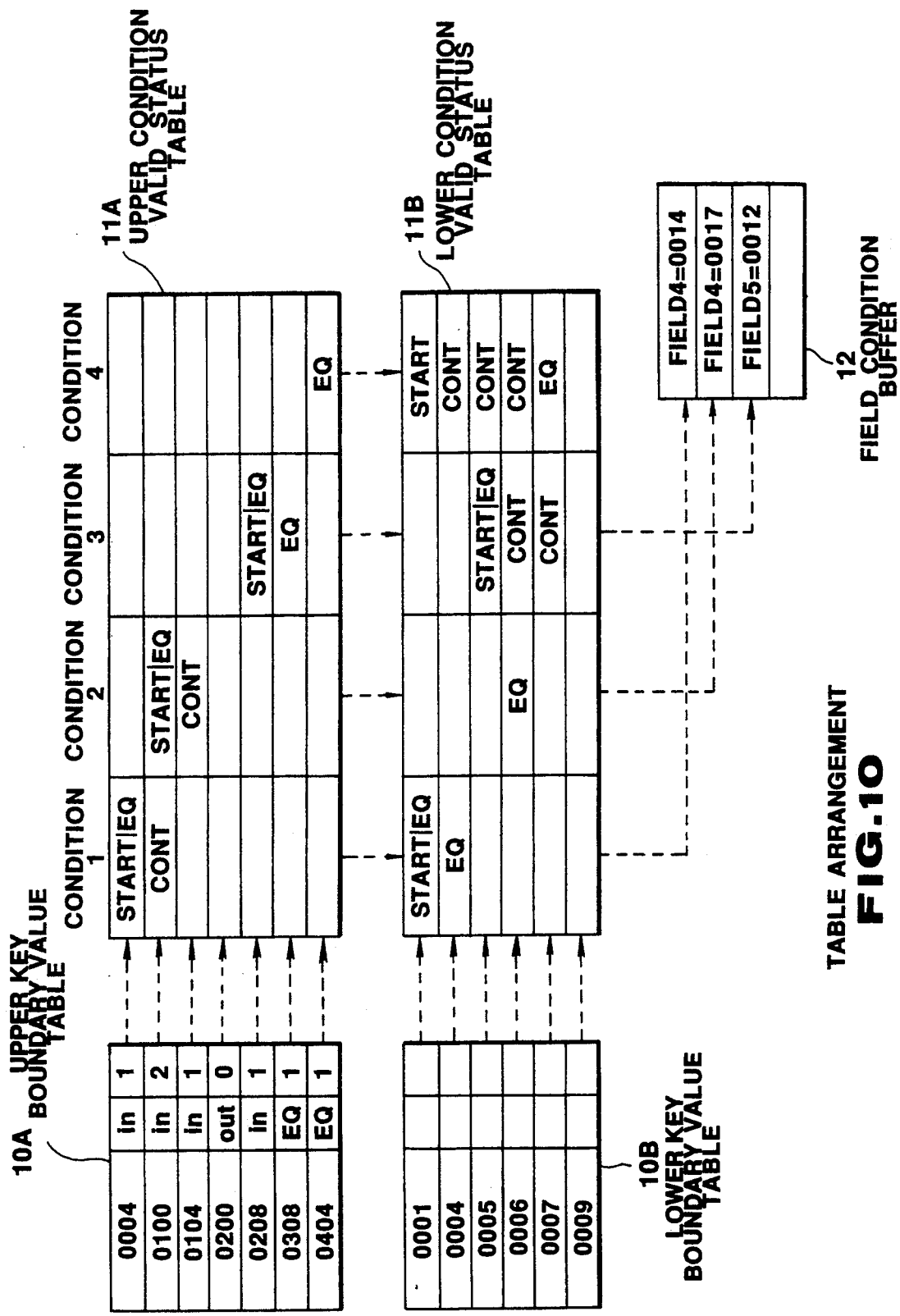

FIG. 10 shows table formats formed in a main storage section 8. In this case, a key boundary value table 10A and a condition valid status table 11A are formed in accordance with upper keys. In addition, a key boundary value table 10B and a condition valid status table 11B are formed in accordance with lower keys. Note that the contents of the key boundary value tables 10A and 10B, of the condition valid status tables 11A and 11B, and a field condition buffer 12 are formed in accordance with designation of the following record retrieval conditions. Similar to the first embodiment, this embodiment employs OR conditions as record retrieval conditions:

Condition 1: $0004 \leq$ upper key $<0104$; lower key $2=0004$; field $4=0014$

Condition 2: $0100 \leq$ upper key $<0200$; lower key $2=0006$; field $4=0017$

Condition 3: $0208 \leq$ upper key $<0308$; $0005 \leq$ lower key $2<0009$; field $5=0012$ Condition 4: upper key $=0404$; $0001<$ lower key $2<0007$ In this case, record valid flags and valid condition counts cannot be set in the lower key boundary value tale 10B before record retrieval processing is started. They are generated during retrieval processing as needed and are stored in the key boundary value table 10B. This is because record valid flags and valid condition counts to be stored in the key boundary value table 10B cannot be determined until record read ranges with respect to upper keys are determined. In other words, record valid flags and valid condition counts of the key boundary value table 10B are generated during retrieval processing so as not to read out unnecessary records which do not satisfy lower key conditions. In this case, the contents of the table 10B are updated as needed.

As described above, this embodiment is essentially the same as the first embodiment except for the following characteristics:

(1) Record retrieval is performed on the basis of the AND of upper and lower keys constituting a keyword.

(2) The key boundary value tables 10A and 10B, and the condition valid status tables 11A and 11B are formed in correspondence with upper and lower keys.

(3) In record retrieval, after record read ranges with respect to upper keys are determined by referring to the upper key boundary value table 10A and the condition valid status table 11A, record valid flags and valid condition counts to be stored in the lower key boundary value table 10B are generated in accordance with the ranges.

(4) Record read ranges with respect to lower keys are also determined by referring to the lower key boundary value table 10B and the condition valid status table 11B, thus reducing the read ranges.

Figure 11:
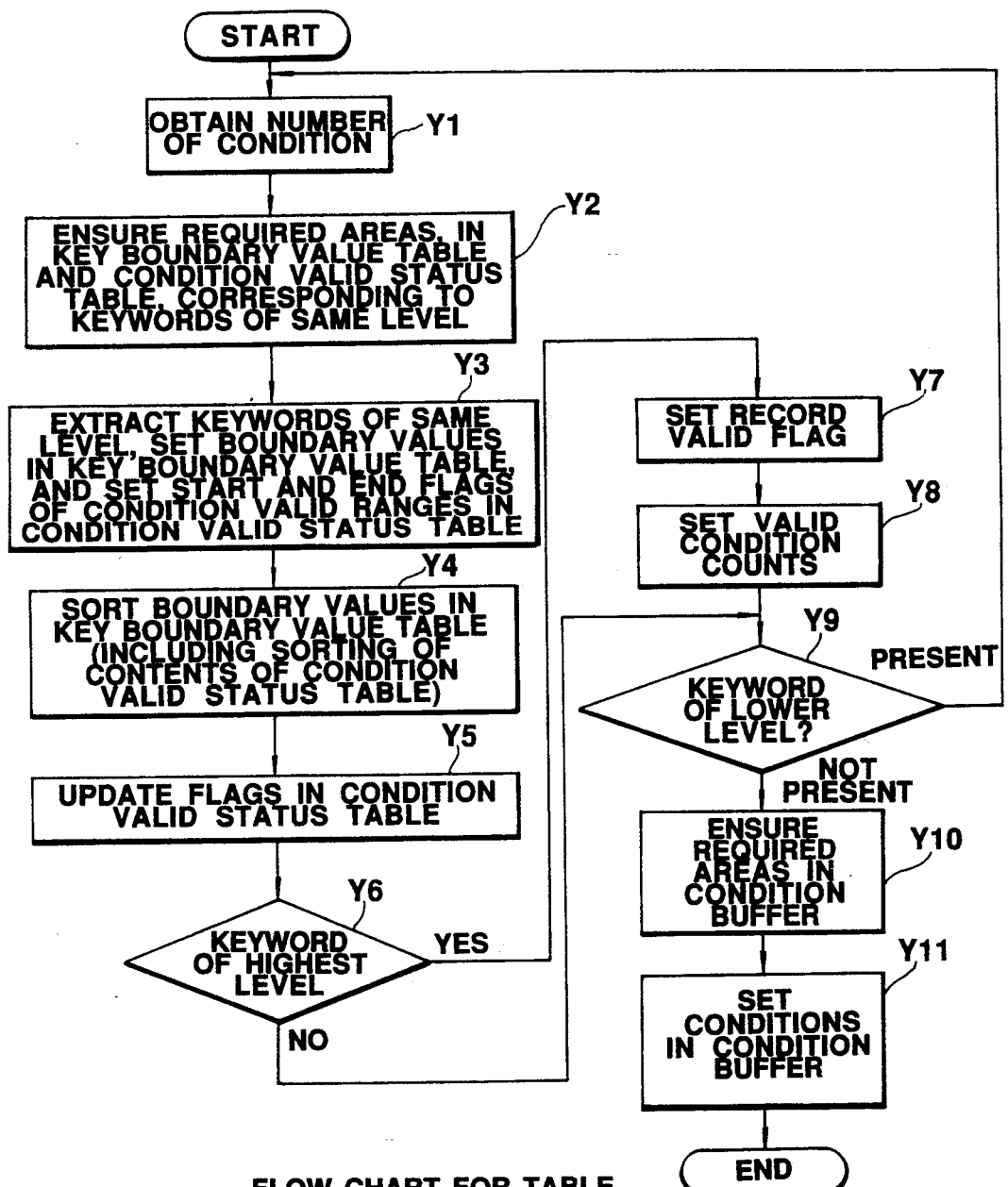

FIG. 11 is a flow chart of table forming processing. FIGS. 12(A) and 12(B) taken together show a flow chart of record retrieval processing. Since the second embodiment is essentially the same as the first embodiment, different portions will be mainly described below to avoid redundancy.

Table forming processing

The flow chart in FIG. 11 is essentially the same as that in FIG. 3. In this embodiment, however, the key boundary value table 10B and the condition valid status table 11B corresponding to lower keys are formed after the key boundary value table 10A and the condition valid status table 11A corresponding to upper keys are formed, and the field condition buffer 12 is formed last. That is, table forming is sequentially performed from the uppermost level to the lowermost level.

First, processing is performed to form the key boundary value table 10A and the condition valid status table 11A corresponding to upper keys (steps Y1 to Y5). Note that since steps Y1 to Y5 correspond to steps X1 to X5 in FIG. 3, a description thereof will be omitted. The flow then advances to step Y6 to check whether a currently processed key is the uppermost level key. Since processing for upper keys is currently performed, processing is performed to write a record valid flag and a valid condition count in the key boundary value table 10A (steps Y7 and Y8). If the current key is not the uppermost level key, i.e., if processing for lower keys is currently performed, a record valid flag and a valid condition count to be stored in the lower key boundary value table 10B are generated during record retrieval processing, as described above. For this reason, if a lower key is detected in step Y6, the flow advances to step Y9, and setting of a record valid flag and a valid condition count (steps Y6 and Y7) is not performed.

When the key boundary value table 10A and the condition valid status table 11A corresponding to upper keys are formed in this manner, the flow advances to step Y9 to check whether a lower level key is present. In this case, since a lower key is detected, the flow returns to step Y1, and the key boundary value table 10B and the condition valid status table 11B corresponding to lower keys are formed (step Y2 to Y5).

Lastly, the field condition buffer 12 is formed (steps Y8 and Y9).

Note that FIG. 11 shows a case wherein table forming processing can be performed even with respect to an index key consisting of three or more fields. In this case, key boundary value tables and condition valid status tables corresponding to the number of fields are formed.

Record retrieval processing

"Previous record row" in step B1 indicates a boundary range in a specific row, of the key boundary value table 10A, to which the upper key of a record immediately preceding a current record belongs. If an incoincidence between the previous record row and a current target row n is detected in steps B11 and B14, a valid flag and a valid condition count in the key boundary value table 10B are updated (step B12 and B15). That is, the previous record row is used to detect a timing at which a valid flag or a valid condition count in the lower key boundary value table 10B is updated.

In step B1, an initial value "0" is set in "previous record row".

Subsequently, the flow advances to step B2 to seek the index file 7 on a condition that an upper key is equal to or more than a boundary value stored in the first row of the upper key boundary value table 10A, and a lower key has the minimum value. With this operation, the read pointer value is shifted to a key position at which an index key, of index keys having boundary values "0004" stored in the first row of the key boundary value table 10A as upper keys, which has the minimum value "0000" as a lower key is present.

In this embodiment, seek conditions are different from those in the first embodiment. Other processing in FIG. 12(A) (steps B3 to B9) correspond to steps A2 to A8 in FIG. 5, and they are essentially the same except that steps B3 to B9 in this embodiment are performed with respect to upper keys.

More specifically, a specific row of the key boundary value table 10A to which the upper key of a readout record belongs is checked (step B5). If the upper key is identical to a boundary value in the nth row, and a valid flag in the nth row is "in" or "EQ" (step B9), the flow advances to step B14. In contrast to this, if the upper key is not identical to the boundary value, and the valid flag in the nth row is "in" (step B6), the flow advances to step B11. Note that a record read range with respect to the upper key has already been determined when the flow advances to step B11 or B14. If, therefore, an incoincidence is detected in step B11 or B14, a valid flag and a valid condition count to be stored in the lower key boundary value table 10B are generated (steps B12 and B15). The second embodiment is different from the first embodiment in this respect.

Assume that a start record corresponding to the seek conditions in step B2 is read out. In this case, a record having an upper key "0004" and a lower key "0000" is read out. Since the upper key is equal to the boundary value in the first row of the key boundary value table 10A, and the valid flag in the first row is "in", the flow advances to step B14. Since n is "1" and the previous record row is "0", an incoincidence is detected in step B14. The flow then advances to step B15. In step B15, condition numbers at which the flags "START", "START| EQ", "CONT", and "EQ" are stored in the nth row of the condition valid status table 11A corresponding to upper keys are regarded as valid, and record valid flags and valid condition counts to be stored in the key boundary value table 10B are generated by referring to the condition valid status table 11B corresponding to lower keys and are stored in corresponding areas in the key boundary value table 10B.

Figure 14:
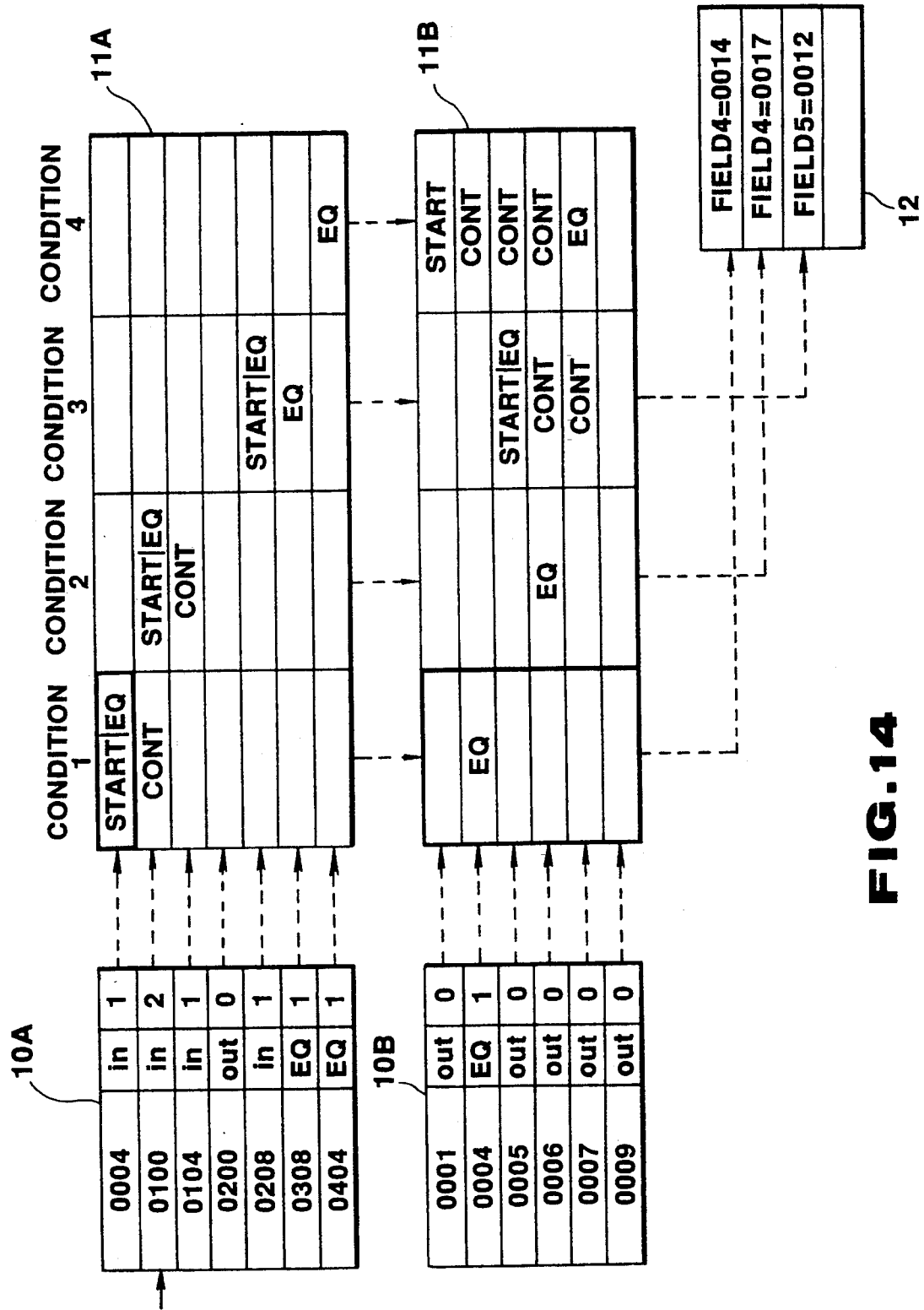

FIG. 14 shows the contents of the tables in this case. More specifically, since a flag is set in only an area, in the first row of the condition status table 11A, corresponding to "condition 1", only a condition number "1" is valid, as indicated by a thick line in FIG. 14. Record valid flags and valid condition counts to be stored in the key boundary value table 10B are generated by referring to flags set in the lower condition valid status table 11B and corresponding to this condition number "1". The generated values are stored in corresponding areas of the key boundary value table 10B. In this case, since the flag "EQ" is set in only the second row of the condition valid status table 11B, the record valid flag "EQ" and a valid condition count "1" are generated and stored in the second row of the key boundary value table 10B. In all the other rows of the key boundary value table 10B, the flags "out" are stored, and all the valid condition counts become "0".

Figure 15:
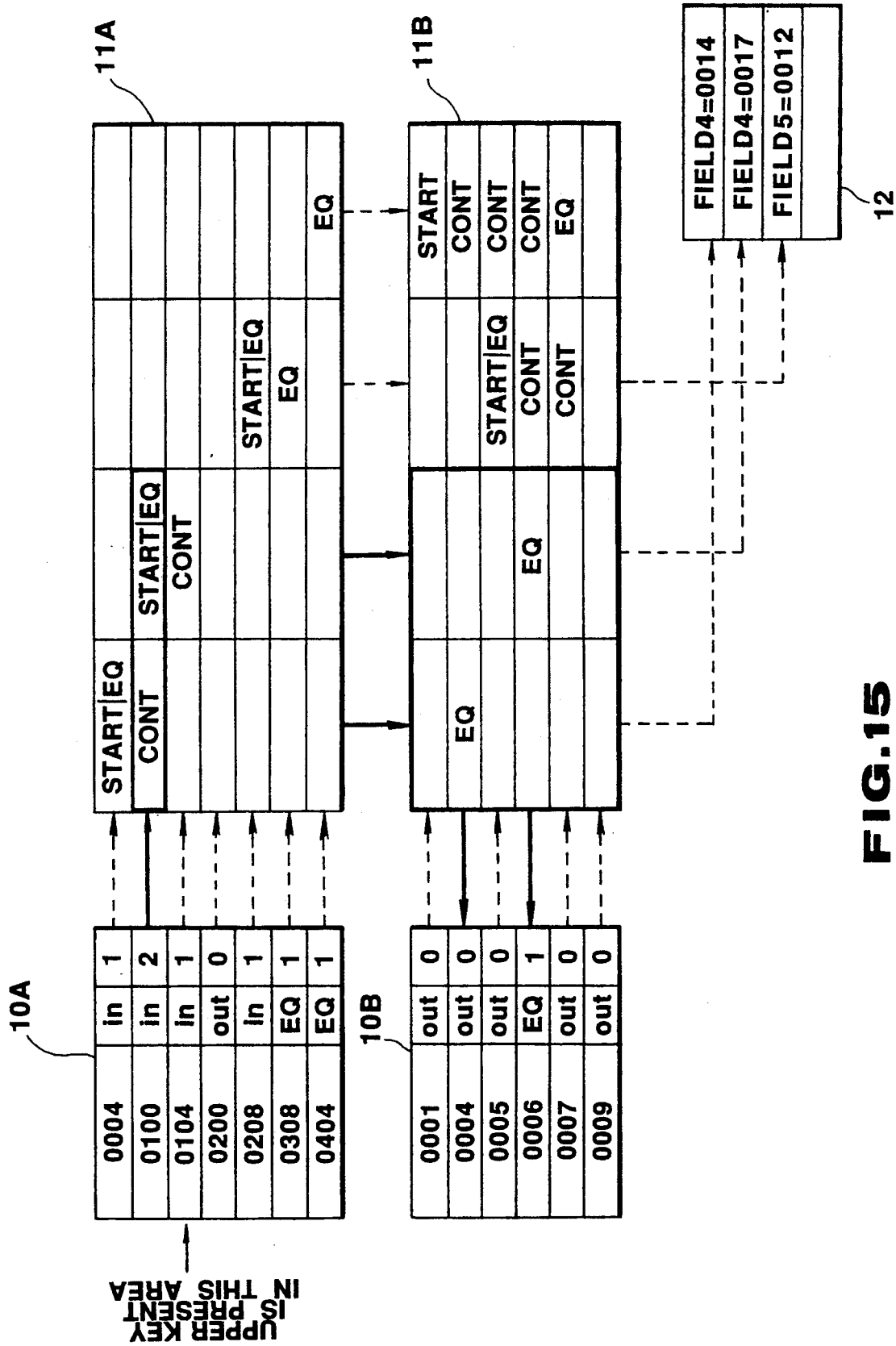
Figure 16:
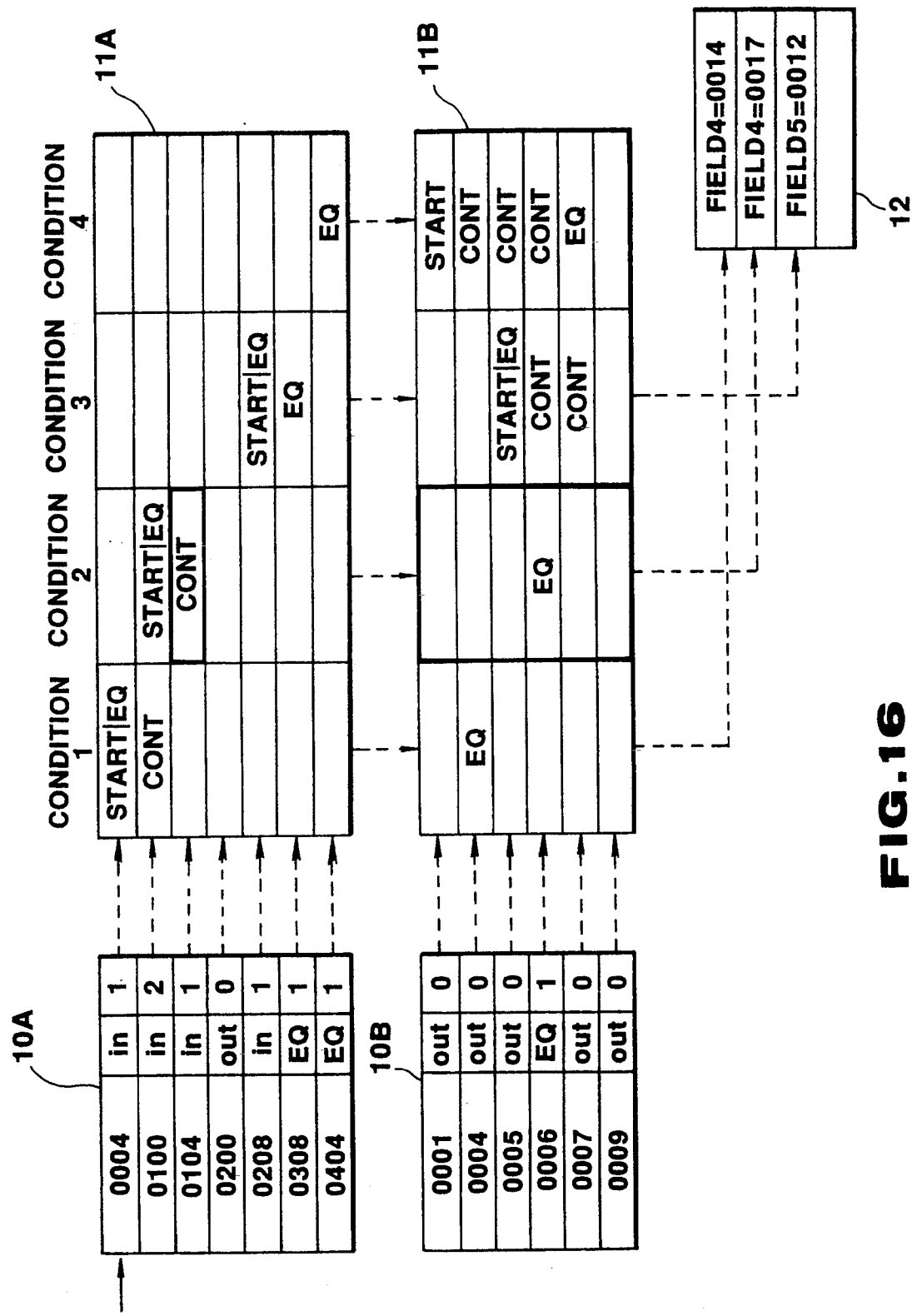

FIGS. 15 and 16 show the contents of the lower key boundary value table 10B, which are respectively obtained by updating the contents of the table 10B when a target row is shifted to the second and third rows of the upper key boundary value table 10A, i.e., when it is detected that the upper key of each readout record falls within the ranges of the second and third rows of the upper key boundary value table 10A.

In step B12, the same processing as in step B15 described above is performed except that when the condition valid status table 11A is searched for valid condition numbers, condition numbers at which the flags "EQ" are stored are excluded because of the conditions in steps B5 and B6. Otherwise, step B12 is essentially the same as step B15.

When the processing of updating the contents of the lower key boundary value table 10B is completed in this manner, the flow advances to step B13 to update "previous record row". The flow then advances to the step following a connector ⑥ in FIG. 13.

If the valid flag is "out" (step B9), or "EQ" or "out" (step B6), a seek operation is performed on a condition that an upper key is equal to or more than a key value in the (n+1)th or subsequent row of the key boundary value table 10A in which "EQ" or "in" is set, and a lower key has the minimum value (step B7). If a key corresponding to this condition is present, the flow returns to step B4.

Figure 13:
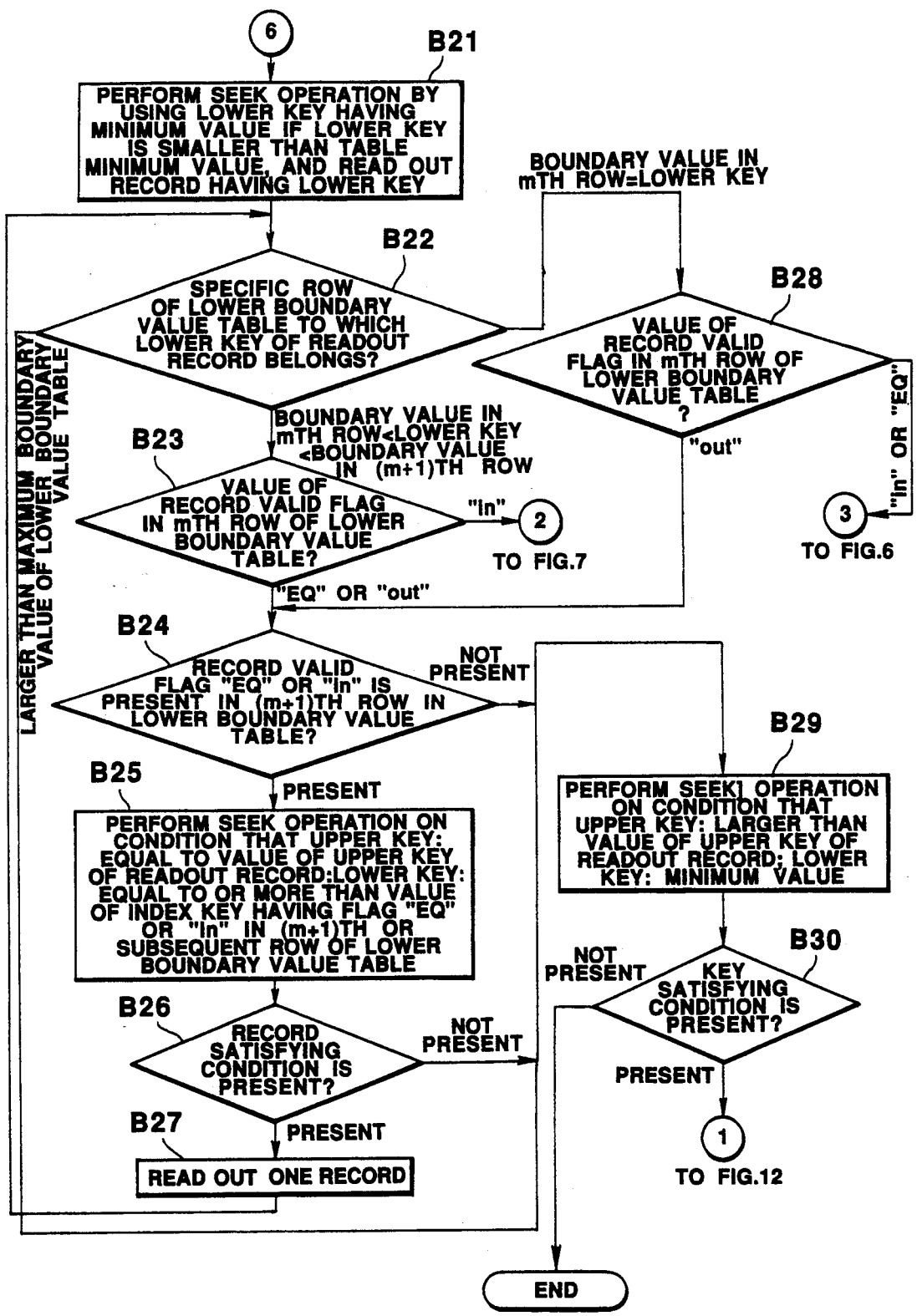

FIG. 13 is a flow chart for performing processing with respect to lower keys by referring to the key boundary value table 10B formed in the above-described manner. The flow chart in FIG. 13 is essentially the same as that in FIG. 5. However, especially seek conditions are different.

Assume that the lower key of a readout record is smaller than the minimum value stored in the key boundary value table 10B. For example, a readout record having a lower key "0000" is smaller than the minimum value "0001" in the key boundary value table 10B. In this case, a seek operation is performed by using an index key, as a condition, which has an upper key equal to the upper key of the readout record and a lower key having the minimum value in the key boundary value table 10B, and a record corresponding to this condition is read out (step B21).

Subsequently, a specific row, in the key boundary value table 10B, to which the lower key of the readout record belongs is checked (step B22). If the lower key is identical to a boundary value in the nth row, and the valid flag "in" or "EQ" is set in the nth row (step B28), the flow advances to the processing shown in FIG. 6 in the first embodiment. If it is not the boundary value, and the valid flag "in" is set (step B23), the flow advances to the processing in FIG. 7. If it is detected in the processing in FIG. 6 or 7 that the record satisfies the condition, the record is written in the output data memory 13.

If the record valid flag "out" is set (step B28), or the record valid flag "EQ" or "out" is set (step B23), it is checked whether the record valid flag "EQ" or "in" is present in the mth and subsequent rows of the key boundary value table 10B (step B24). For example, since the record valid flag "out" is stored in the first row of the lower key boundary value table 10B shown in FIG. 14, the flow advances to step B24. In this case, since the valid flag "EQ" is stored in the second row, the flow advances to step B25 to perform a seek on a condition that an upper key is equal to the value of the upper key of the readout record, and a lower key is equal to or more than the value of a key in the (m+1)th or subsequent row, of the key boundary value table 10B, in which the flag "EQ" or "in" is set. As a result, a seek operation is performed up to a key position at which the upper key falls within the same range and the lower key has "0004". If a key corresponding to this condition is present (step B26), a record having this key is read out (step B27), and the flow returns to step B22.

If the record valid flag "out" is set in the third row of the key boundary value table 10B, and the record valid flags "out" are set in all the subsequent rows, since records having lower keys in the third and subsequent rows need not be read out, the flow advances to step B29 to perform a seek operation by using a keyword as a condition which has an upper key larger than the upper key of the readout record and a lower key having the minimum value. Note that step B29 is also executed if it is detected in step B22 that a lower key is larger than the maximum boundary value or if it is detected in step B26 that there is no key satisfying a seek condition. In this case, if there is a key which satisfies the seek condition (step S30), the flow advances to step B4 in FIG. 12(A) to read out a record having the key.

Record retrieval processing is performed in this manner. As shown in FIG. 9, it is apparent that the amount of records to be read out by using a keyword consisting of upper and lower keys (see (B) in FIG. 9) is smaller than that by using a keyword consisting of only an upper key (see (A) in FIG. 9).

In the above-described record retrieval processing according to the second embodiment, a keyword is constituted by two fields. However, record retrieval processing to be performed by using a keyword constituted by three or more fields is essentially the same as that of the second embodiment. In this case, hierarchical processing is required. That is, when the contents of a key boundary value table of a higher level are updated, the contents of key boundary value tables of the lower levels are sequentially updated. When the contents of a key boundary value table of the lowest level are updated lastly, check processing of field conditions is performed.

In each of the above-described embodiments, a key boundary value table includes record valid flags and valid condition counts. However, they need not be included. In this case, record valid flags and valid condition counts may be obtained as needed by searching a condition valid status table.

In each embodiment described above, a field condition buffer is arranged. If, however, no field conditions are included in retrieval conditions, such a buffer is not required. In this case, a condition valid status table need not be divided in units of conditions and may be unified such that flags are arranged in areas in one column.

In addition, in the above embodiments, a data file is indirectly accessed by using an index file. However, it is apparent that if records in the data file are sorted in the order of keys in advance, no index file is required.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A record retrieval method in a data processing apparatus which has a data file for storing a plurality of records each identified by a keyword and which performs a records operation in response to an OR designation of record retrieval conditions constituted by a combination of the keywords so as to read out records satisfying the conditions from the data file, comprising the computer implemented steps of:

extracting keywords representing a boundary of the record retrieval condition;

preparing a keyword boundary table in which the extracted keywords are arranged in the order in which they were extracted in the extracting step, and then sorting the extracted keywords;

storing in a condition valid status table a start flag and an end flag representing a valid range of the record retrieval condition, the condition valid status table comprising m rows×n columns (where m and n are integers of 1 or more), rows of said condition valid status table corresponding to the keywords in the keyword boundary table and columns of said condition valid status table corresponding to the record retrieval conditions, respectively;

sorting the contents of the condition valid status table in accordance with the contents of the keyword boundary table;

searching the condition valid status table in units of columns and rows for updating flags in the condition valid status table, and storing an updated flag in an area at the intersection of the mth row and the nth column in the condition valid status table, the updated flag representing whether a condition corresponding to the nth column in the condition valid status table is valid for record retrieval in the boundary range of the mth row to the (m+1)th row in the keyword boundary table; and reading out records in the order of the keywords from the data file, determining that a read out record belongs to the mth row in the keyword boundary table, and determining that the read out record is one satisfying the designated record retrieval condition if the valid flag exists in the area at the intersection of the mth row and the column corresponding to the designated record retrieval condition in the condition valid status table.

2. The method according to claim 1, wherein the designation of the record retrieval conditions includes designation of conditions of specific field values of records, records satisfying the conditions being read out from said data file, further comprising a step of writing the designated specific field values in a field condition buffer for storing field values in correspondence with said condition valid status table; and wherein the step of reading out records includes a step of selecting records having fields satisfying the values in said field condition buffer after the corresponding records are read out.

3. The method according to claim 1, wherein:

said record in said data file has an upper keyword and a lower keyword, and the designation of the record retrieval conditions includes designation of AND conditions constituted by upper and lower keywords, records satisfying the conditions being read out from said data file;

the step of preparing said keyword boundary table includes the step of forming keyword boundary tables from record retrieval conditions of upper keywords and from record retrieval conditions of lower keywords, respectively;

the condition valid status table comprises an upper condition valid status table and a lower condition valid status table;

the step of storing a flag includes a step of storing a flag corresponding to the record retrieval conditions of the upper keywords in the upper condition valid status table and a step of storing a flag corresponding to the record retrieval conditions of the lower keywords in the lower condition valid status table; and the step of reading out the records includes a step of detecting the flag in said condition valid status table of the lower keywords if the flag is present in an area of said condition valid status table of the upper keywords corresponding to one boundary range of said keyword boundary table of the upper keywords, and a step of reading out records which fall within a boundary range of said keyword boundary table of the lower keywords if the flag is detected.

* * * * *